United States Patent
Eleryan et al.

(10) Patent No.: US 12,552,562 B2
(45) Date of Patent: Feb. 17, 2026

(54) CONCENTRIC VERTICAL DUCTED PROPULSION FOR AERIAL VEHICLES

(71) Applicant: CLEO ROBOTICS INC., Boston, MA (US)

(72) Inventors: Omar Eleryan, Boston, MA (US); Szymon Czarnota, Boston, MA (US); Luiz Sampaio, Boston, MA (US)

(73) Assignee: CLEO ROBOTICS INC., Boston, MA (US)

( * ) Notice: Subject to any disclaimer, the term of this patent is extended or adjusted under 35 U.S.C. 154(b) by 0 days.

(21) Appl. No.: 18/750,436

(22) Filed: Jun. 21, 2024

(65) Prior Publication Data

US 2025/0388349 A1    Dec. 25, 2025

(51) Int. Cl.
  *B64U 30/26*   (2023.01)
  *B64C 29/00*   (2006.01)
  *B64U 10/20*   (2023.01)

(52) U.S. Cl.
  CPC .......... *B64U 30/26* (2023.01); *B64C 29/0033* (2013.01); *B64U 10/20* (2023.01)

(58) Field of Classification Search
  CPC ...... B64U 30/26; B64U 10/20; B64C 29/0033
  See application file for complete search history.

(56) References Cited

U.S. PATENT DOCUMENTS

| | | | | | |
|---|---|---|---|---|---|
| 3,002,709 | A | * | 10/1961 | Cochran | B64C 29/0025 D12/330 |
| 3,127,093 | A | * | 3/1964 | Sudrow | F04D 29/386 416/240 |
| 3,417,943 | A | * | 12/1968 | Frederick | B64C 29/0025 180/119 |
| 3,442,469 | A | * | 5/1969 | Davis | B64C 29/0066 244/23 C |
| 3,489,374 | A | * | 1/1970 | Morcom | B64C 39/06 244/93 |
| 4,196,877 | A | * | 4/1980 | Mutrux | B64C 39/06 416/114 |
| 4,300,738 | A | * | 11/1981 | Whinfrey | F16L 3/12 248/62 |
| 4,433,819 | A | * | 2/1984 | Carrington | B64C 39/001 244/52 |
| 4,457,476 | A | * | 7/1984 | Andresevitz | B64C 29/00 244/23 C |
| 4,461,436 | A | * | 7/1984 | Messina | B64C 27/20 446/37 |
| 4,533,095 | A | * | 8/1985 | Yates | B64D 33/02 244/130 |

(Continued)

*Primary Examiner* — Medhat Badawi
(74) *Attorney, Agent, or Firm* — Polsinelli PC

(57) ABSTRACT

Systems, methods, and devices include an aerial vehicle (AV) with a plurality of coaxially aligned vertical ducts. The lower vertical duct has a larger diameter than the upper vertical duct. Furthermore, the upper vertical duct at least partially contains a first propulsion component and the lower vertical duct at least partially contains a second propulsion component. The lower vertical duct can be coupled to the upper vertical duct by duct couplers which forms an air intake gap between the upper vertical duct and the lower vertical duct. The AV also includes one or more steering flaps disposed on the lower vertical duct, configured to manipulate an air flow out the bottom of the lower duct, thus controlling navigation and stability of the AV.

19 Claims, 23 Drawing Sheets

(56) References Cited

U.S. PATENT DOCUMENTS

| | | | | |
|---|---|---|---|---|
| 4,856,732 A * | 8/1989 | Eickmann | B64D 35/00 | 244/66 |
| 5,035,377 A * | 7/1991 | Buchelt | B64C 11/001 | 416/223 R |
| 5,082,079 A * | 1/1992 | Lissaman | B64U 60/50 | 180/118 |
| 5,150,857 A * | 9/1992 | Moffitt | B64U 30/296 | 244/34 A |
| 5,277,381 A * | 1/1994 | Piasecki | B64C 27/82 | 244/17.19 |
| 5,295,643 A * | 3/1994 | Ebbert | B64U 10/13 | 428/117 |
| 5,421,538 A * | 6/1995 | Vassa (Suratano Thienphropa) | B64C 27/20 | 244/23 B |
| 5,507,453 A * | 4/1996 | Shapery | B64C 29/0025 | 244/73 C |
| 6,170,778 B1 * | 1/2001 | Cycon | B64U 30/20 | 244/6 |
| 6,270,038 B1 * | 8/2001 | Cycon | B64U 30/14 | 244/12.3 |
| 6,371,406 B1 * | 4/2002 | Corcoran | B64G 1/28 | 244/23 C |
| 6,604,706 B1 * | 8/2003 | Bostan | B64U 50/14 | 244/6 |
| 7,149,611 B2 * | 12/2006 | Beck | B64U 30/26 | 701/32.4 |
| 7,520,466 B2 * | 4/2009 | Bostan | B64U 50/14 | 244/12.3 |
| 7,874,513 B1 * | 1/2011 | Smith | B64C 11/001 | 244/12.4 |
| 8,919,691 B2 * | 12/2014 | Lindmark | B63B 39/06 | 244/101 |
| 9,619,776 B1 * | 4/2017 | Ford | B64U 80/86 | |
| 9,975,633 B1 * | 5/2018 | Johnson | B64C 11/001 | |
| 10,246,200 B2 * | 4/2019 | Williams, Sr. | B64G 1/4021 | |
| 10,669,020 B2 * | 6/2020 | Vuong | B64C 11/001 | |
| 10,766,615 B1 * | 9/2020 | Quarrie | B64C 27/24 | |
| 10,780,988 B2 * | 9/2020 | Buchmueller | B64D 1/12 | |
| 11,084,577 B2 * | 8/2021 | Sabie | B64C 27/24 | |
| 11,161,608 B2 * | 11/2021 | Namgoong | G05D 1/101 | |
| D956,144 S * | 6/2022 | MacNeal | D21/468 | |
| 11,753,150 B2 * | 9/2023 | Park | B64U 50/14 | 244/17.11 |
| 11,766,623 B1 * | 9/2023 | Chen | A63H 33/18 | 446/46 |
| 12,145,753 B2 * | 11/2024 | Bitar | B60L 50/60 | |
| 12,205,483 B1 * | 1/2025 | Cao | G08G 5/57 | |
| 12,227,318 B1 * | 2/2025 | Bata | B64U 20/83 | |
| 2002/0030137 A1 * | 3/2002 | Kirjavainen | B64C 29/00 | 244/51 |
| 2007/0102565 A1 * | 5/2007 | Speer | B64U 10/20 | 244/2 |
| 2007/0158494 A1 * | 7/2007 | Burrage | B64C 39/04 | 244/7 R |
| 2007/0246601 A1 * | 10/2007 | Layton | B64C 39/10 | 244/12.2 |
| 2007/0262195 A1 * | 11/2007 | Bulaga | B64U 10/20 | 244/12.4 |
| 2012/0156039 A1 * | 6/2012 | Bulin | B64C 11/48 | 136/212 |
| 2016/0214728 A1 * | 7/2016 | Rossi | B64U 30/291 | |
| 2016/0340021 A1 * | 11/2016 | Zhang | B64C 27/006 | |
| 2017/0152060 A1 * | 6/2017 | Morisawa | B64U 60/50 | |
| 2018/0044013 A1 * | 2/2018 | Groninga | B64U 30/12 | |
| 2018/0057157 A1 * | 3/2018 | Groninga | B64C 39/008 | |
| 2018/0257775 A1 * | 9/2018 | Baek | B64U 30/26 | |
| 2019/0185161 A1 * | 6/2019 | Eleryan | G05D 1/46 | |
| 2019/0270517 A1 * | 9/2019 | Morgan | B64D 27/12 | |
| 2019/0380518 A1 * | 12/2019 | Shendelman | A47G 19/025 | |
| 2020/0230514 A1 * | 7/2020 | Letang | A63F 9/001 | |
| 2021/0094686 A1 * | 4/2021 | Metzner | G08B 13/1965 | |
| 2021/0331797 A1 * | 10/2021 | Geng | B64D 27/24 | |
| 2021/0362836 A1 * | 11/2021 | Parks | B64C 29/0025 | |
| 2022/0009626 A1 * | 1/2022 | Baharav | B64C 39/04 | |
| 2022/0009647 A1 * | 1/2022 | Johannesson | B64U 20/96 | |
| 2022/0194575 A1 * | 6/2022 | Duffy | F02K 1/002 | |
| 2023/0105466 A1 * | 4/2023 | Eleryan | B64D 35/00 | 701/3 |
| 2024/0158073 A1 * | 5/2024 | Globerman | B64C 27/10 | |
| 2024/0239530 A1 * | 7/2024 | Eleryan | B64C 37/00 | |
| 2025/0019074 A1 * | 1/2025 | Bansal | B64C 39/064 | |

* cited by examiner

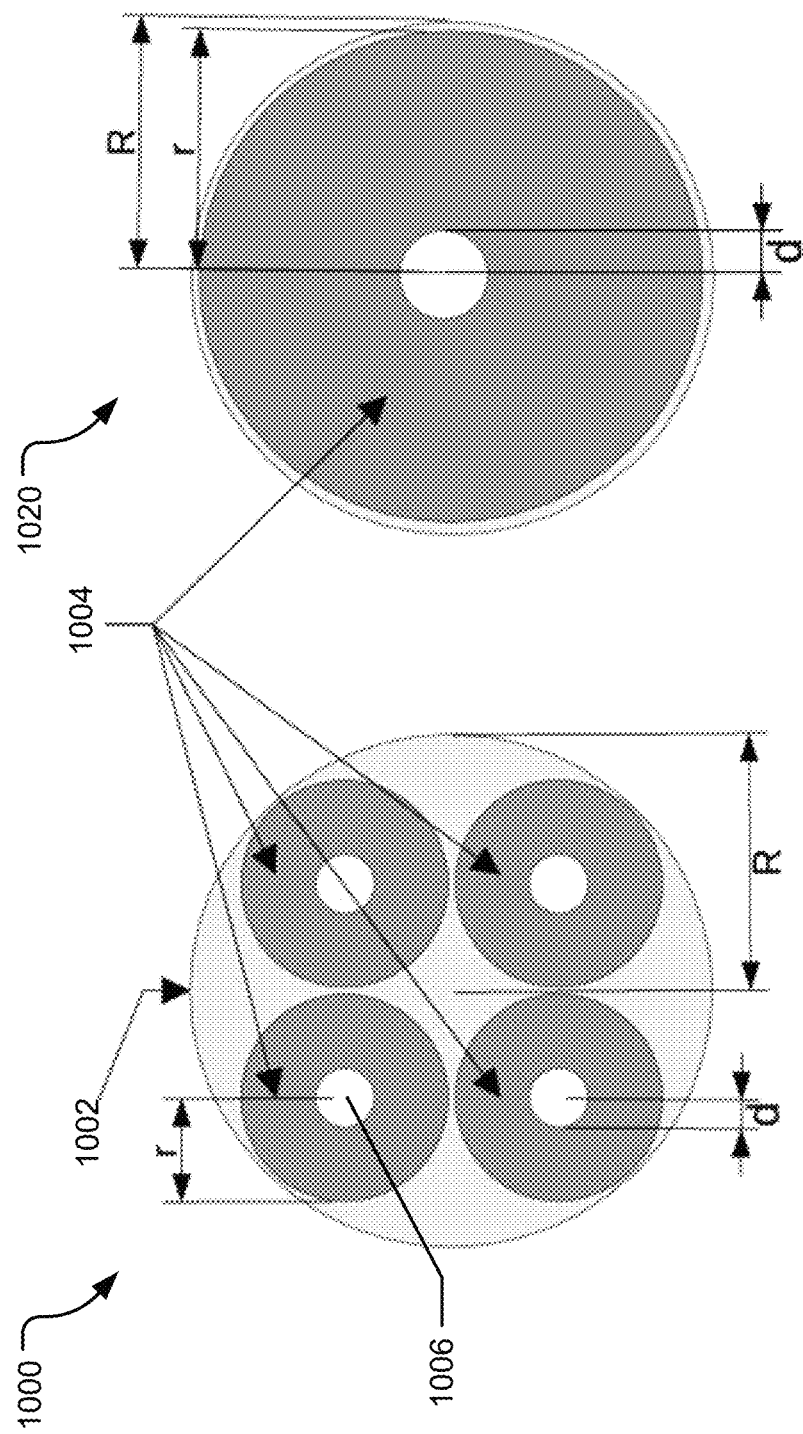

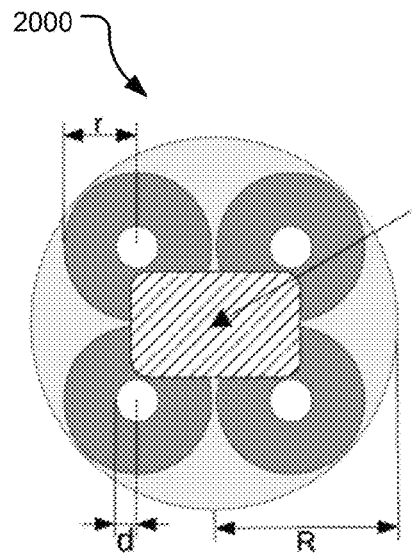
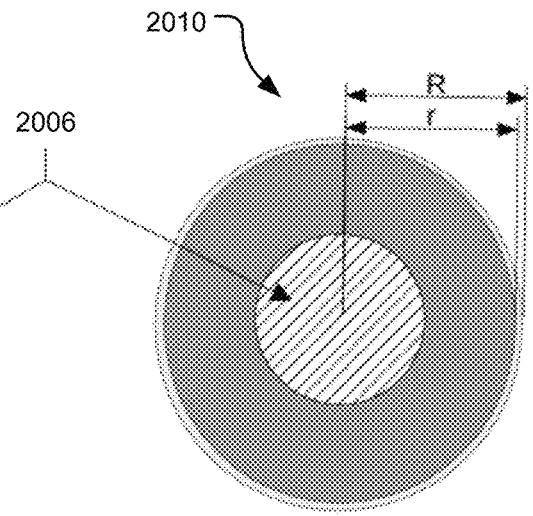
FIG. 2A  FIG. 2B
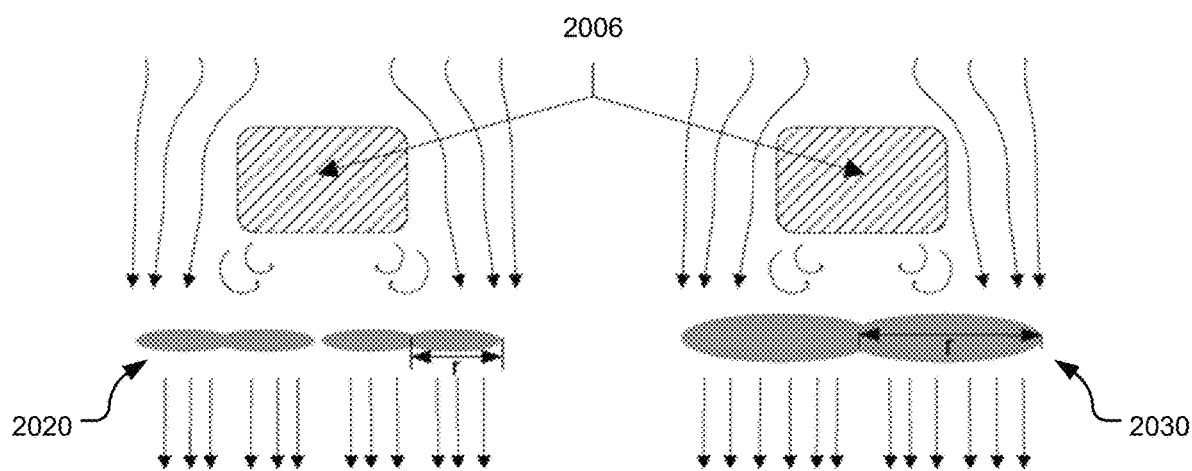
FIG. 2C  FIG. 2D

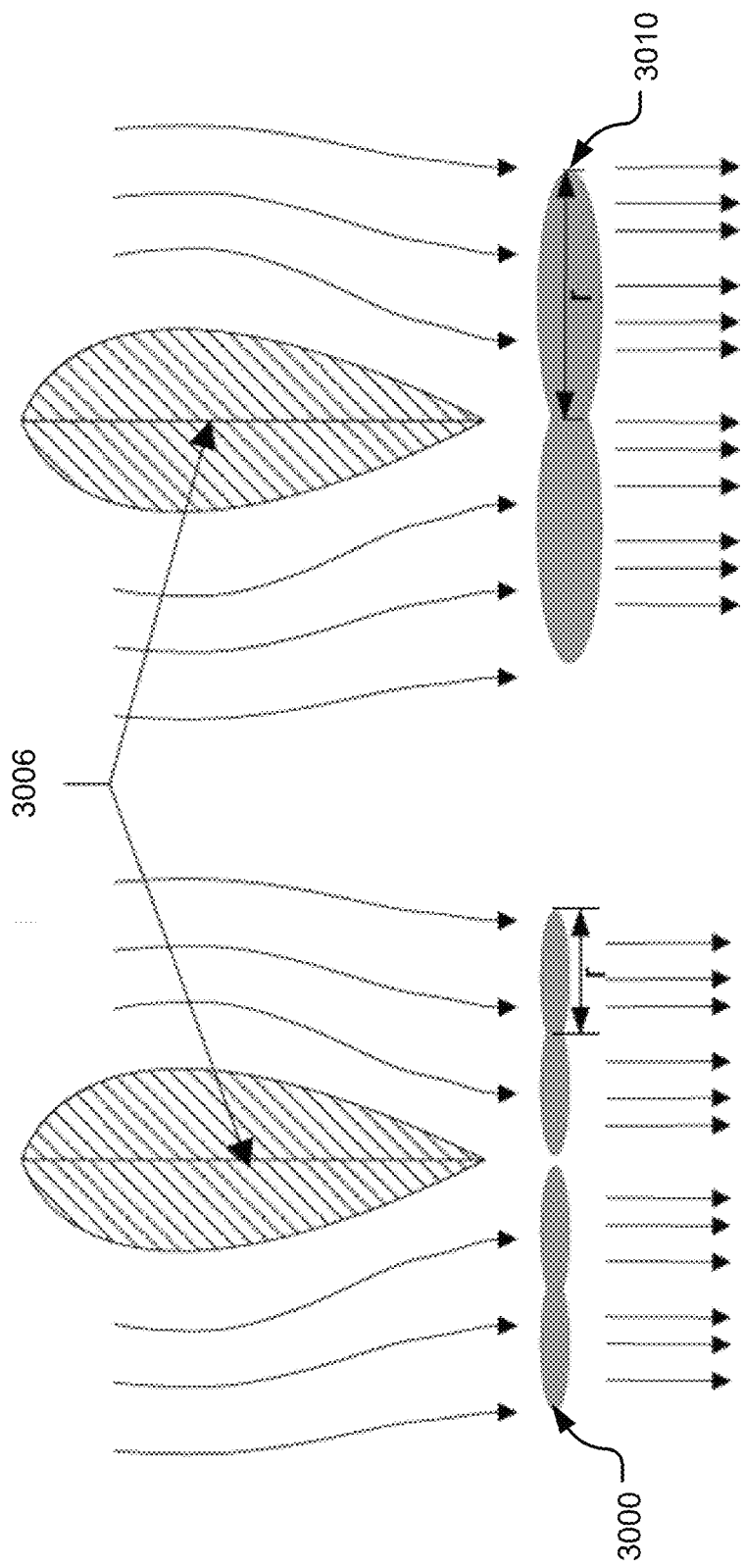

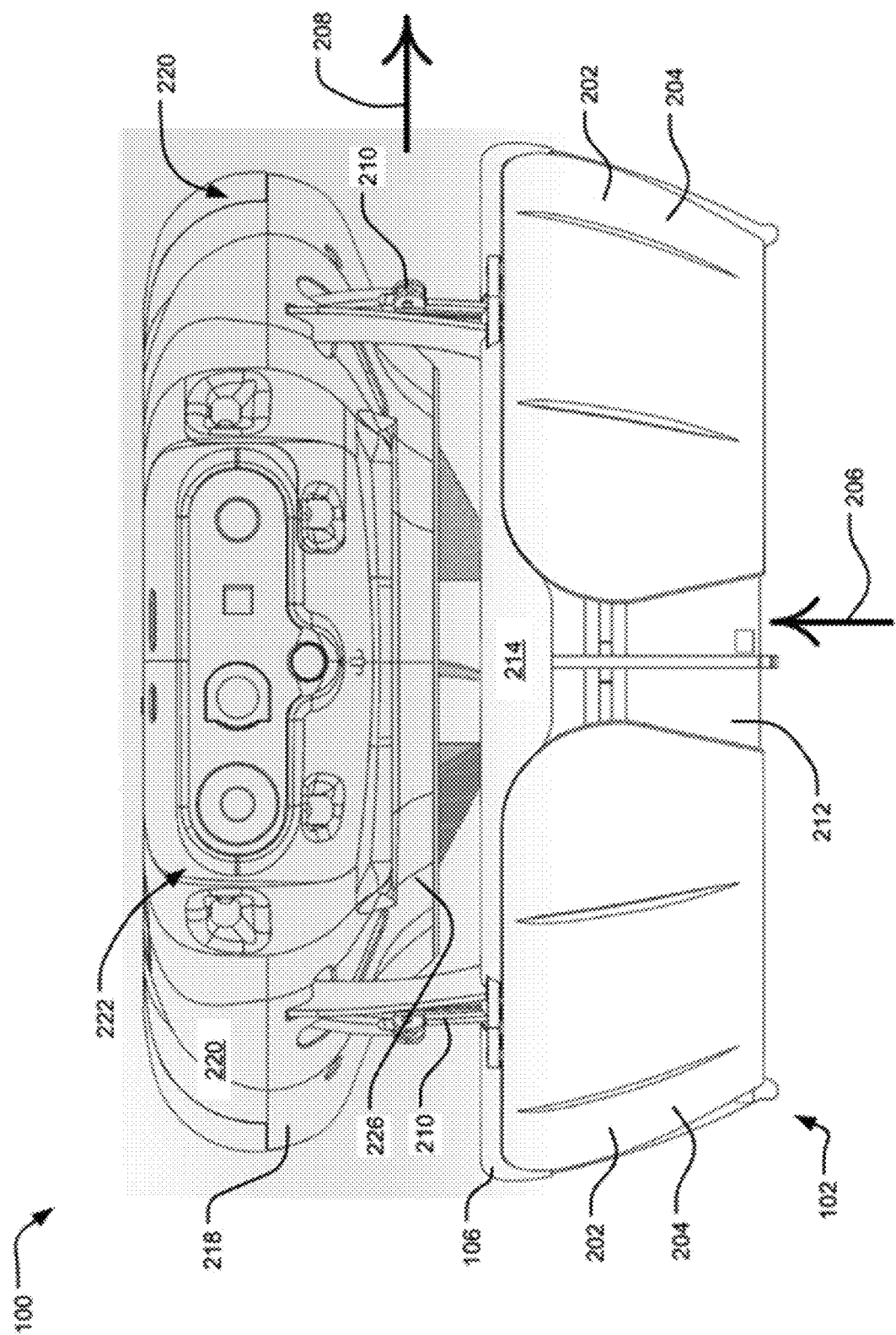

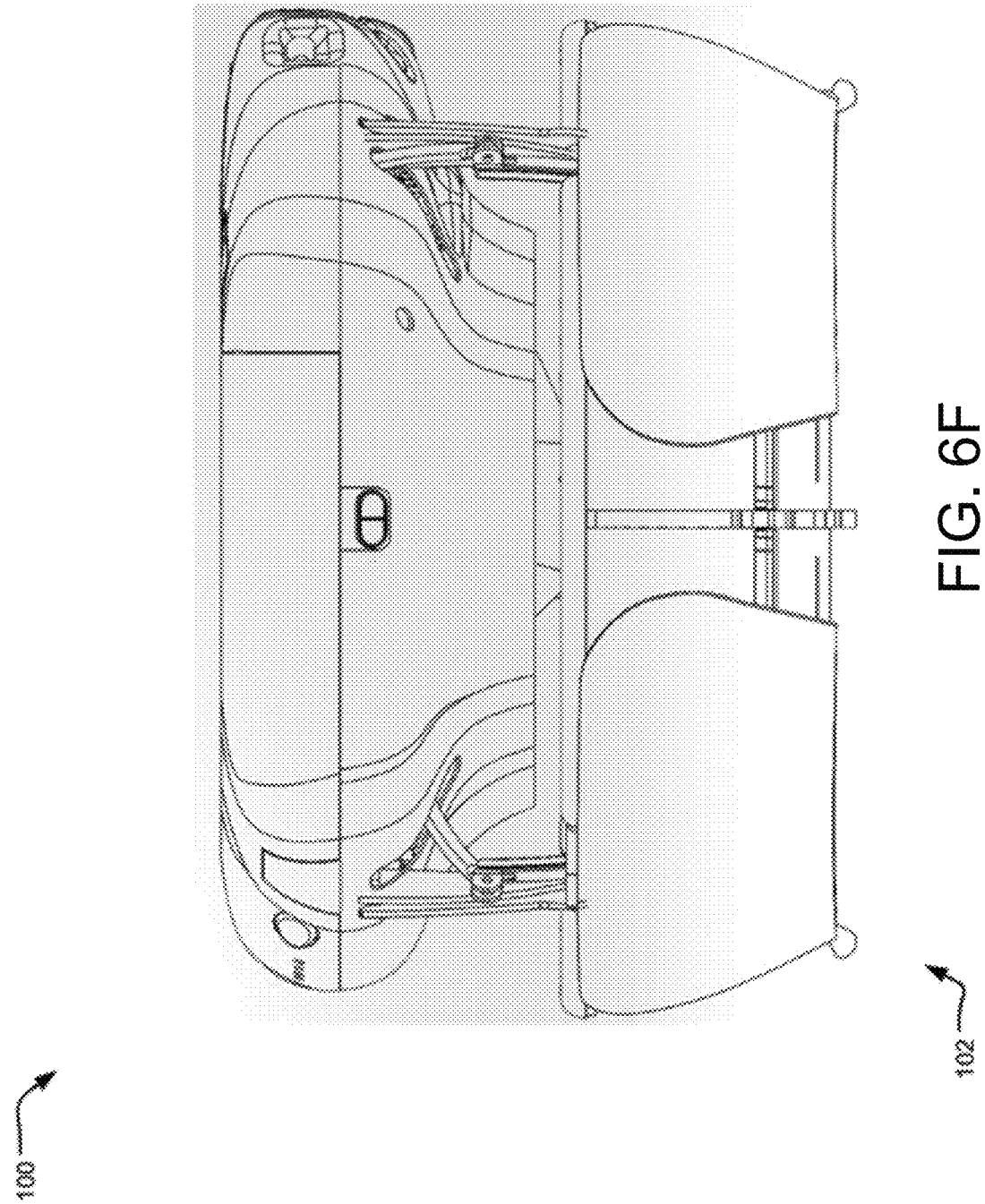

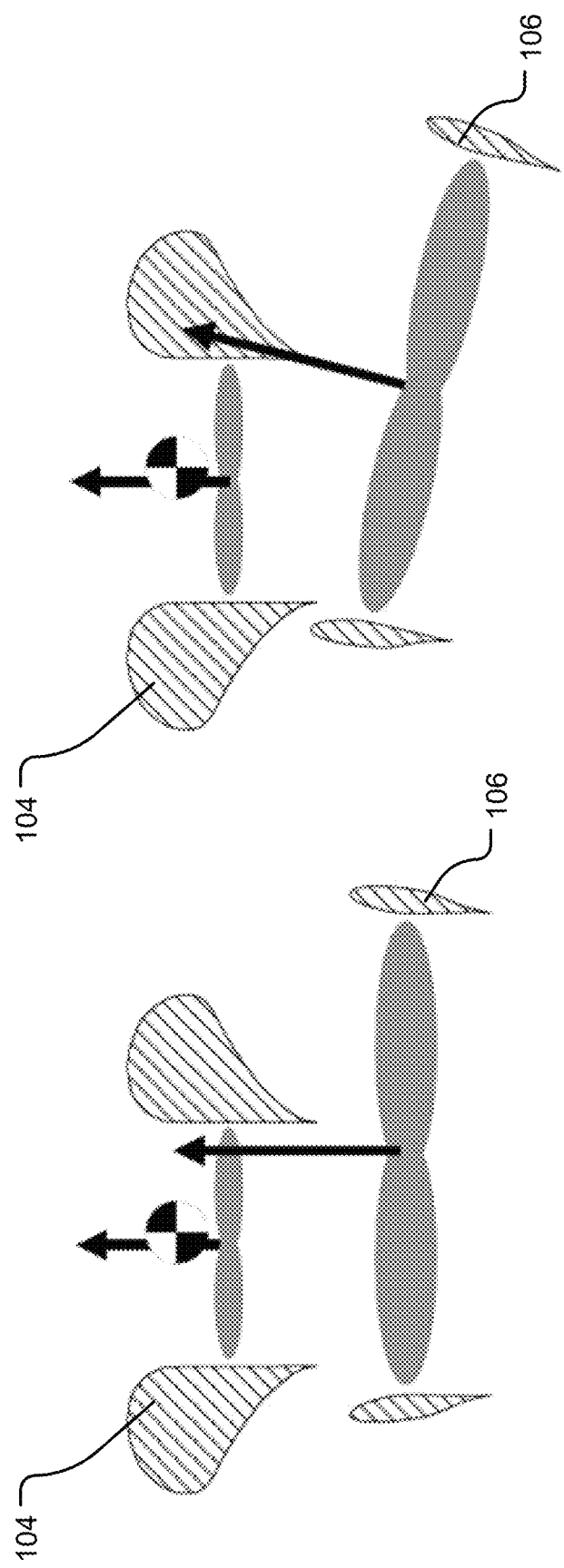

CONCENTRIC VERTICAL DUCTED PROPULSION FOR AERIAL VEHICLES

FIELD

Aspects of the present disclosure relate to an aerial vehicle, such as a manned or an aerial vehicle with a plurality of vertical ducts or flow regions that provide efficient thrust, maneuverability, and payload placement within or on the vehicle's body.

BACKGROUND

Aerial vehicles (AVs) perform various tasks including aerial surveillance for military, civilian, and commercial purposes. Such AVs typically use multiple rotating planar propellers to generate lift and to control the AV's flight path. However, using multiple propellers may negatively impact the overall efficiency of the AV by reducing flight time and lift capacity. For this reason, traditional AV configurations (e.g., in which four or more exposed propellers are connected to a small center body) have a limited volume space for the payload and may be unsafe to operate around humans and/or animals as the propellers are exposed. Regardless, this configuration has been widely adopted in most new aerial urban transportation vehicle designs, where efficiency, flight time, and payload volume should be top priorities.

It is with these observations in mind, among others, that various aspects of the presently disclosed technology were conceived and developed.

BRIEF SUMMARY

The aforementioned problems can be addressed using the systems, methods, and devices disclosed herein. For instance, an aerial vehicle can include a first duct defining at least a first portion of an air pathway for generating a lift force, a second duct defining at least a second portion of the air pathway, the second duct being disposed below and collinearly aligned with the first duct, and one or more propellers or propulsion systems arranged within at least one of the first duct or the second duct to generate an airflow through the air pathway. The one or more propulsion devices may include is a propeller, a rotor, a turbomachinery component, or a gas combustion jet In some configurations, one or more flaps may be coupled to the second duct and movable between different positions to provide controlling movement of the aerial vehicle by affecting, deflecting, or otherwise changing the airflow to maneuver the aerial vehicle.

Various configurations of the aerial vehicle may be possible. For example, some configurations may include the first duct extending into the second duct such that at least a portion of the first duct is located within an inner portion of the second duct. In some examples, the first duct can have a first diameter and the second duct can have a second diameter, the second diameter being greater than the first diameter. In other examples, the first diameter of the first duct may be larger than the second diameter of the second duct. In still other examples, one or both of the propellers may operate in an open configuration without a duct, in which case the propellers of different sizes may spin at different speeds to optimize the tip speed of each propeller.

The aerial vehicle can also include one or more duct couplers connecting the first duct to the second duct. The one or more duct couplers can be hinged such that the second duct is movable relative to the first duct, which can be used in some instances as a control mechanism and/or way to collapse the body to save space during storage. Additionally the one or more propellers can include a first propeller disposed within the first duct and a second propeller disposed within the second duct. Furthermore, the first propeller can have a first length dimension and the second propeller can have a second length dimension that is greater than the first length dimension.

In some examples, the propulsion mechanism (such as, but not limited to, rotating propellers, rotors, a turbomachinery components, a gas combustion jets, etc.) may be driven by one or more motors supported by connecting struts that are aerodynamically profiled, such as stators. Such stators may be configured to be aerodynamically neutral or somewhat neutral (e.g., including a symmetrical profile at zero or near zero flow incidence) or may serve the purpose of redirecting or straightening the airflow. Such stators may be positioned above or below the propellers or other propulsion mechanism and any number of stators may be included. In one particular example, the connecting struts may be located downwind of the airflow to reduce noise generated by the aerial vehicle. If located upwind of the propeller or propellers, the connecting struts may be designed or constructed to be neutral or to provide some amount of pre-swirl.

In some examples, the one or more motors may be installed within the duct volume which may include a driving shaft inside the stator blades that transmits the power to the propulsion system. Stator blades or fins located below the bottom propeller may also provide correction to the airflow and/or additional protection from external bodies damaging the bottom propeller.

In some examples, the one or more flaps can include a plurality of flaps, such as four flaps, disposed with equidistant spacing around an exterior of the second duct. Also, the second duct can include a plurality of receiving areas formed into an outer surface of the second duct, the plurality of receiving areas being shaped to receive the plurality of flaps when the plurality of flaps are in an a retracted position. Furthermore, the aerial vehicle can include an air intake gap formed by a space between the first duct and the second duct.

In some instances, an aerial vehicle includes a first duct defining at least a first portion of an air pathway; and/or a second duct defining at least a second portion of the air pathway. The second duct can be disposed below and collinearly aligned with the first duct. Also, the aerial vehicle can include one or more propellers arranged within the second duct to pull air through at least an air intake gap defined between the first duct and the second duct; and/or one or more movable navigation members coupled to the second duct for controlling movement of the aerial vehicle.

In some scenarios, the one or more movable navigation members can include at least one of a plurality of flaps movable between a retracted position and an extended position; or a plurality of wheels extending from the second duct. The aerial vehicle can further include a plurality of duct couplers extending between the first duct and the second duct. Additionally, the aerial vehicle can include an air intake gap having a width dimension corresponding to a length of the plurality of duct couplers. Furthermore, the one or more propellers can include a first propeller disposed within the first duct; and/or a second propeller disposed within the second duct. The second propeller can be larger than the first propeller. The aerial vehicle can also include a memory device storing computer-readable instructions that, when executed by one or more processors, cause the aerial vehicle to perform a maneuver operation by extending at least one of the one or more movable navigation members into the air pathway.

In some examples, a method of controlling movement of an aerial vehicle can include generating at least a first portion of a lift force for the aerial vehicle by rotating a first propeller disposed within a first vertical duct; generating at least a second portion of the lift force by rotating a second propeller disposed within a second vertical duct, the second vertical duct being disposed below and coaxially aligned with the first vertical duct; and/or causing a change to an air flow through an air pathway defined by the first vertical duct coaxially aligned with the second vertical duct, the change to the air flow caused by moving one or more flaps disposed at the second vertical duct.

In some instances, causing the change to the air flow can affect a lift force component, and the aerial vehicle can be maneuvered based on the change to the air flow affecting the lift force component. Furthermore, rotating the second propeller can include pulling air through an air intake gap between the first vertical duct and the second vertical duct. The method can also include actuating one or more ducts such that the first vertical duct moves relative to the second vertical duct as part of a flight maneuver, as this displaces the center of thrust and generates a moment. This thrust displacement can be in a plane or can include a tilt angle. Moreover, the method can further include actuating one or more duct couplers such that the aerial vehicle collapses into a storage mode.

In another implementation, several small propellers may be used to cover a secondary flow region, possibly each with a tilted axis and without sharing or interacting with the airflow coming from the top duct. Flight control could be achieved by changing the rotation of each propeller. In one example, an interface between the two regions can be separated by a wall with a changeable cross-section shape along the vertical coordinate to cover the area between the small propellers in order to increase the total effective area.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

BRIEF DESCRIPTION OF THE DRAWINGS

FIG. 1A illustrates an overhead view of a multi-copter aerial vehicle configuration.

FIG. 1B illustrates an overhead view of a single propeller configuration.

FIG. 2A illustrates a top view of a multi-copter aerial vehicle with a payload area above the propellers.

FIG. 2B illustrates a top view of a single propeller aerial vehicle with a cylindrical payload area above the propeller.

FIG. 2C illustrates a cross-section view of an AV with four propellers and a corresponding payload area.

FIG. 2D illustrates a cross-section view of an AV with a propeller and a corresponding payload area.

FIG. 3A illustrates a cross-section view of an AV with four propellers and a corresponding streamlined payload area.

FIG. 3B illustrates a cross-section view of an AV with a propeller and a corresponding streamlined payload area.

FIG. 6A illustrates a front elevation view of an example system including an aerial vehicle having a plurality of collinear vertical ducts.

FIG. 6F illustrates a right side view of an example system including an aerial vehicle having a plurality of collinear vertical ducts.

FIG. 10A illustrates a cross-section view of an aerial vehicle with a bottom propulsion system horizontally misaligned with a top propulsion system.

FIG. 10B illustrates a cross-section view of an aerial vehicle with a bottom propulsion system horizontally misaligned and titled in relation to a top propulsion system.

DETAILED DESCRIPTION

Figures 4A, 4B:
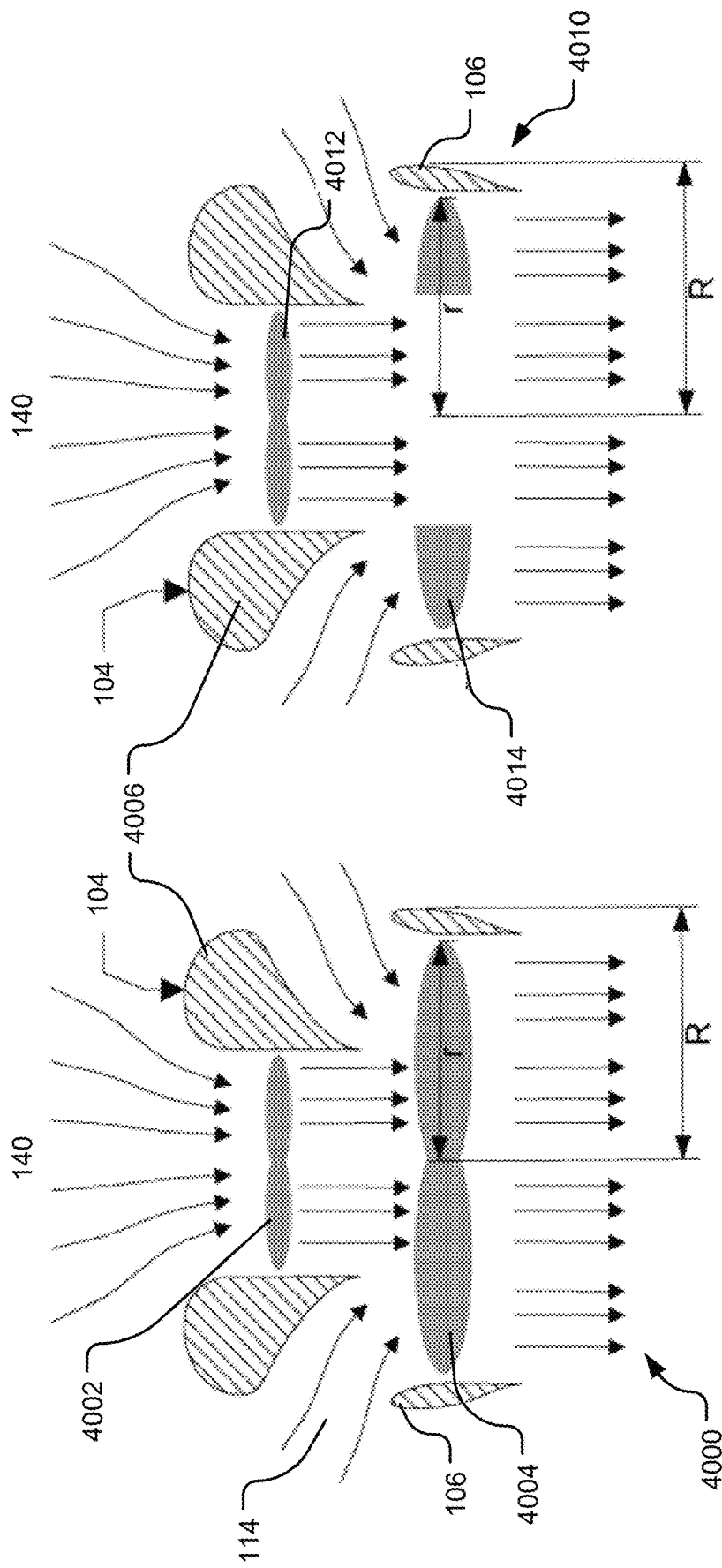
FIG. 4A illustrates a cross-section view of an AV configuration that includes an upper propeller oriented vertically from a lower propeller and a corresponding payload area.
FIG. 4B illustrates a cross-section view of an AV configuration with the same upper propeller as shown in FIG. 4A and a lower propeller configured to cover only the area receiving airflow from the secondary inlet region.

Aerial vehicles (AVs), which may include unmanned or manned aerial vehicles, typically use multiple rotating propellers to generate lift and to control the AVs flight path. However, using multiple propellers in the traditional configuration (e.g. quadcopters) is not generally the best approach for efficient usage of space and energy storage. Consequently, flight time and lift capacity may be greatly reduced, as the figures or merit are intrinsically related to the area effectively used to drive the flow in the thrust direction. In general, each propeller disk of an AV has an inefficient zone near the center of the propeller, with an additional dead zone in between propeller disks in multi-copter configurations. For example, FIG. 1A illustrates an overhead view of a multi-copter aerial vehicle configuration 1000 and FIG. 1B illustrates an overhead view of a single propeller configuration 1020. As shown in FIG. 1A, an outer ring 1002 represents the available footprint for the aerial vehicle, assumed in this example to be a disk of a given radius R. Each propeller 1004 is represented by a smaller ring, each with a radius r. To operate the vehicle, each propeller 1004 drives an airflow downwards, resulting in an aerodynamic lift. For illustration purposes, it is assumed that dead zones exist for each disk propeller (represented by a center ring 1006) with radius d that is 0.1 r. In order to fit the four propellers into the available area of the vehicle footprint 1002, the maximum value of r is approximately r=0.41 R. After subtracting the four dead zones 1006 in the middle of each propeller 1004, the airflow area of the configuration is $4\pi(0.17 R^2 - d^2)$, which is less than 70% of the total available footprint area 1002. In terms of energy or power required to operate the vehicle, this represents around 20% more than would be required than configurations in which a propeller covers the full footprint area 1002, such as shown in FIG. 1B.

Another source of efficiency loss is the payload volume, which typically incurs some airflow blocking, turbulence, and drag, whether placed downwind or upwind from the propellers. For example, FIG. 2A illustrates a top view of a multi-copter aerial vehicle with a payload area above the propellers and FIG. 2B illustrates a top view of a single propeller aerial vehicle with a payload area above the propeller. The multi-copter 2000 of FIG. 2A includes a similar configuration as the AV of FIG. 1A, with payload area 2006. Similarly, single propeller AV 2010 of FIG. 2B is similar to that of FIG. 1B discussed above, with payload area 2006 indicated. Note that the two payloads have different cylindrical cross sections (rectangular in FIG. 2A and circular in FIG. 2B). FIG. 2C illustrates a cross-section view of an AV 2020 with four propellers (two of which visible in FIG. 2C and two that are hidden) and a corresponding payload area 2006 and FIG. 2D illustrates a cross-section view of an AV 2030 with a propeller and a corresponding payload area 2006. Each of FIGS. 2C and 2D illustrate the airflow around the corresponding payload 2006 generated by the propellers. As can be seen, the payload volume of an AV may cause some amount of blocking, turbulence, and drag. For this reason, traditional AV configurations, in which four or more exposed propellers are connected to a small center body, have a limited volume space for a payload thus are generally larger to accommodate payloads which make them generally unsafe to be operated around humans and animals. Even the alternative configuration (in which a single propeller is used to fit the footprint area, despite a more effective user of the available area, also suffers from some payload blocking, as illustrated in FIGS. 2B and 2D.

In some instances, the payload volume illustrated in FIGS. 2A-2D may be optimized to mitigate turbulence and blocking by streamlining the body, which typically includes a long profile which drastically increases the overall device dimensions. This is true for both the multi-copter and single propeller AV configurations discussed above. For example, FIG. 3A illustrates a cross-section view of an AV 3000 with four propellers (such as that of FIG. 2A) and a corresponding streamlined payload area 3006 and FIG. 3B illustrates a cross-section view of an AV 3010 with a propeller and a corresponding streamlined payload area 3006. Although the streamlined payload areas 3006 decreases the turbulence and blocking of the airflow through the propellers, the payload area itself drastically increases the size and weight of the vehicle, which reduces the overall performance of the AV.

As such, disclosed herein is an AV design that allows one to get an improved efficiency with increased payload volume, given a set of dimension constraints, and results in an AV with significant improvements in safety, flight time, and overall performance.

Improvements to previous AV configurations introduced herein reside in the following observations: an effective use of the outflow area of the AV may drastically improve the overall efficiency while, contrary to a general intuition, inlet flow may come vertically or from the sides. This concept allows for a more effective use of the available area of the AV by feeding different regions of the outflow area with airflow coming from different inlets at different directions. In a simple example, FIG. 4A illustrates a cross-section view of an AV configuration 4000 that includes an upper propeller 4002 oriented vertically from a lower propeller 4004. The orientation and configuration of the propellers 4002, 4004 of the AV 4000 is described in more detail. FIG. 4A is included to illustrate an airflow through the propellers and a corresponding payload area 4006 for the AV configuration. In particular, a more efficient airflow is achieved by feeding different regions of the outflow area with flow coming from different inlets from different directions. In addition, the illustrated configuration allows for the design of a streamlined payload volume 4006, which is a significant improvement over previous AV configurations regarding the goal of providing useful volume and weight payload for a given configuration constraints, with optimal efficiency and flight time. In particular, the new airflow from the various directions captured from the secondary (or side) inlets can be used to energize the flow in the turbulent/separation prone regions allowing a more bulky and shorter payload profile by splitting the flow regions that feed the outflow in two or more parts. A lower noise signature may also be achieved by minimizing interference between the propellers as each may be responsible for driving the flow in a given region, independently of the other(s). Another advantage of having two or more ducts is that each corresponding propeller, rotor, or propulsion system can operate at different, optimal speeds. For instance, the larger propeller (typically the bottom most propeller) may operate at lower rpm (rotation per minute) than the smaller one (typically the top one, that drives the innermost flow region) to allow the propellers to operate at similar tip velocity.

These advantages may be implemented in a variety of ways, such as by designing a full bottom propeller to be aerodynamically neutral (such as a symmetrical profile at zero incidence) in the center part of the lower propeller 4004

(such as illustrated in FIG. 4A) where it is receiving the flow from the upper propeller 4002. In another implementation of the AV 4010 as illustrated in FIG. 4B, the lower propeller 4014 is configured to only cover the area receiving airflow from the secondary (or side) inlet region. In this case, the rotor of the lower propeller 4014 may only have blades in an annular region, spanning the region where the airflow comes from the side inlets. The independence of the two (or more) regions is also beneficial to overall efficiency. Through the configurations illustrated in FIGS. 4A and 4B and for a given spatial constraints, increased flow area (perhaps greater than 98% as compared to less than 70% for a typical quad propeller AV), greater energy or power efficiency, flight time, and maximum payload volume in a compact area may be achieved.

The systems, methods, and devices disclosed herein include an aerial vehicle (AV) with a plurality of coaxially aligned vertical ducts (e.g., two) which may be generally axis-symmetrical or cylindrically oriented. In general, the systems and methods described herein may apply to both unmanned or manned aerial vehicles. The AV can include one or more steering flaps disposed on the lower duct configured to manipulate an air flow directed out the bottom of the lower duct, thus controlling navigation and stability of the AV. The lower duct can be coupled to an upper duct by duct couplers, which forms an air intake gap between the upper duct and the lower duct. Furthermore, the lower duct can have a larger diameter, and a correspondingly larger propeller, relative to the upper duct.

In some scenarios, this configuration of components improves the efficiency and increases flight time and payload capacity of the AV. Also, the upper duct and/or lower duct can have a housing providing spaces for various components (e.g., a battery, a control system, sensors, cargo, and so forth), improving weight distribution of the AV. Furthermore, the larger lower duct and/or air intake gap between the plurality of ducts can be used to prevent flow separation at the top body surfaces, allowing an optimal use of the available volume. In this manner, the intake gap(s) may help generate a more uniform air flow through the AV as opposed to one continuous duct, reducing pitch up movements during forward flight and reducing flow separation of the air from the duct wall. The configuration also allows a bulky yet compact payload volume that is aerodynamically efficient in preventing airflow separation and excessive turbulence. Another advantage is that both ducts may be used to provide additional lift when the AV is maneuvering at a smaller angle (in relation to the horizontal), as in an annular wing configuration. Additional configurations may include the most external surfaces of the bottom duct being profiled to passively generate a counter correction momentum in response to a sudden wind gust. For example, a bottom portion of the bottom duct can comprise annular, multi-element profiles with an annular, axis-symmetrical geometry. When a wind gust reaches this portion of the bottom duct, the flow accelerates in the channel or channels and creates a strong pressure differential that generates an aerodynamic force to counteract the wind moment. Additional benefits and advantages of the presently disclosed technology will become apparent from the detailed description below.

Figure 5A:
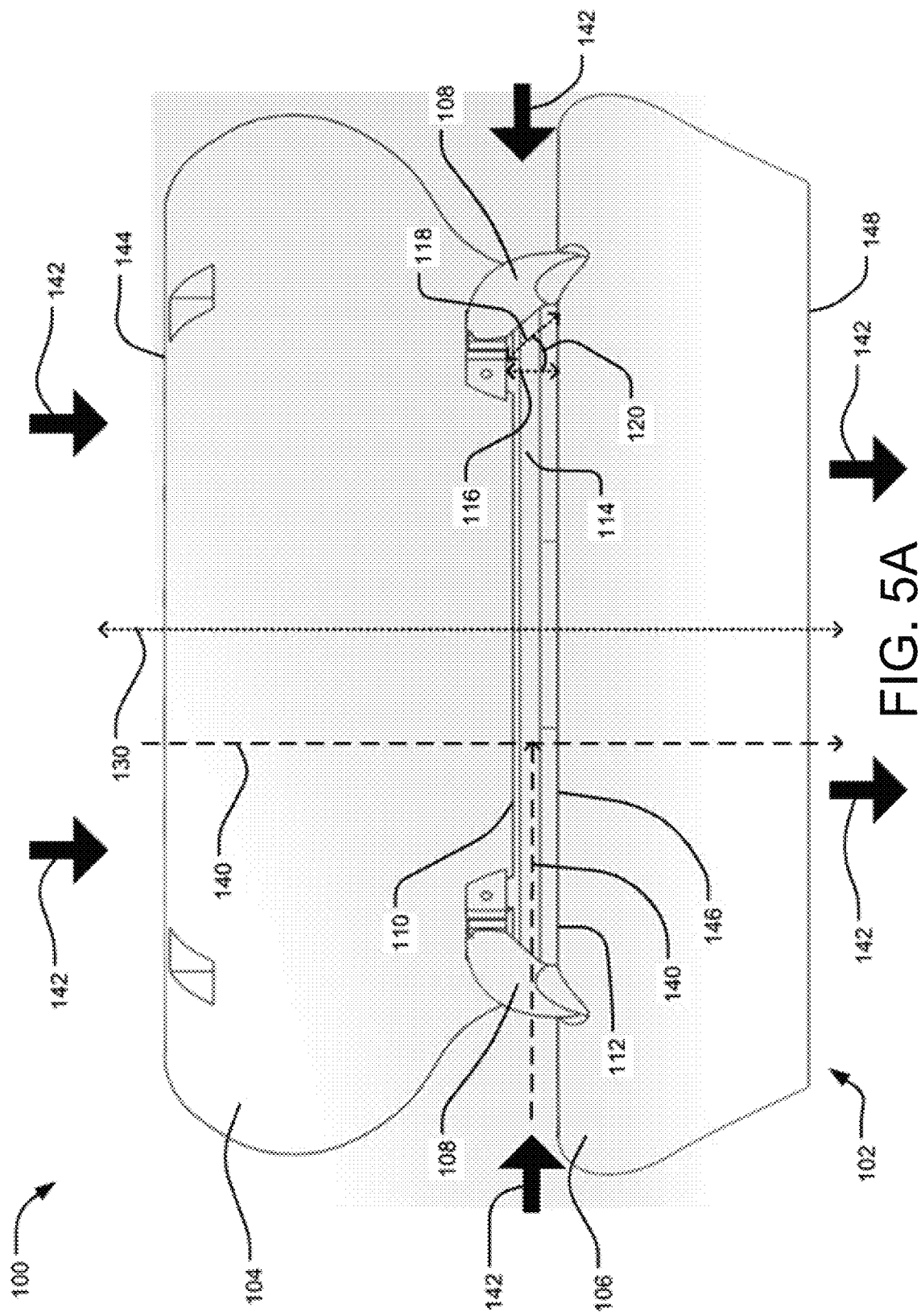
FIG. 5A illustrates a front elevation view of an example system including a plurality of collinear vertical ducts, which can form at least part of an aerial vehicle.
Figure 5B:
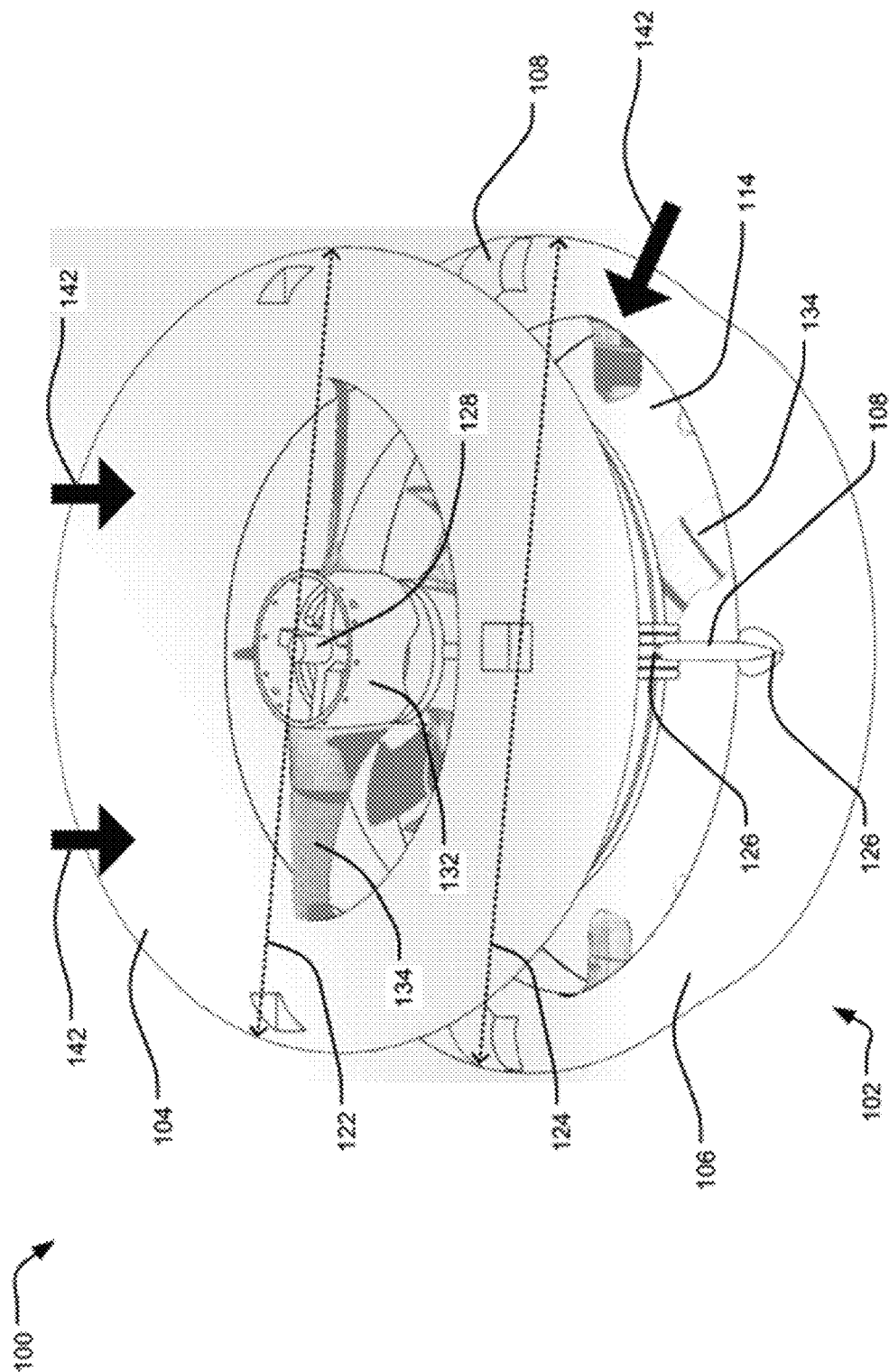
FIG. 5B illustrates a front perspective view of the example system.
Figure 5C:
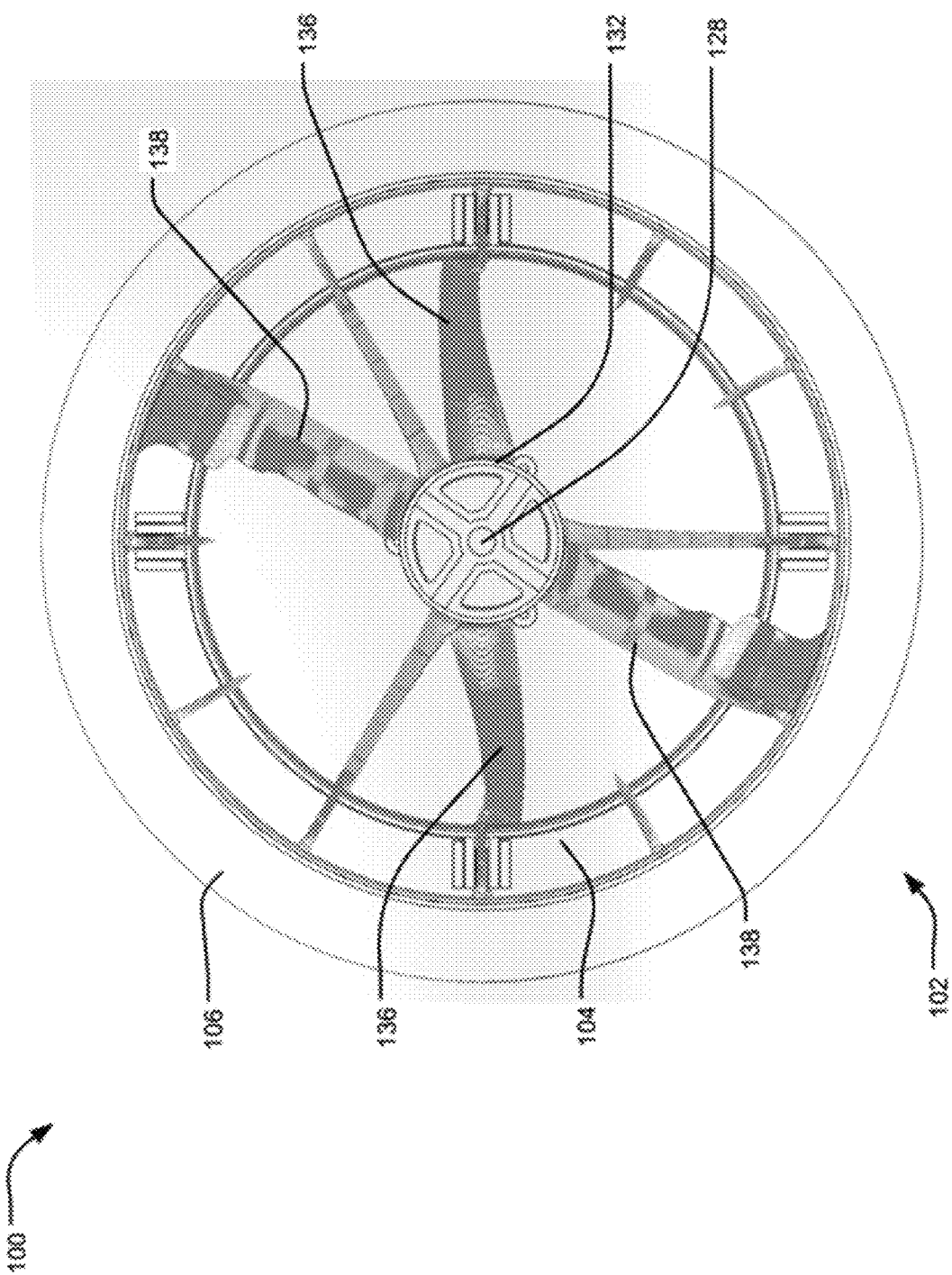
FIG. 5C illustrates a bottom view of an example system including a plurality of collinear vertical ducts, which can form at least part of an aerial vehicle.
Figure 5D:
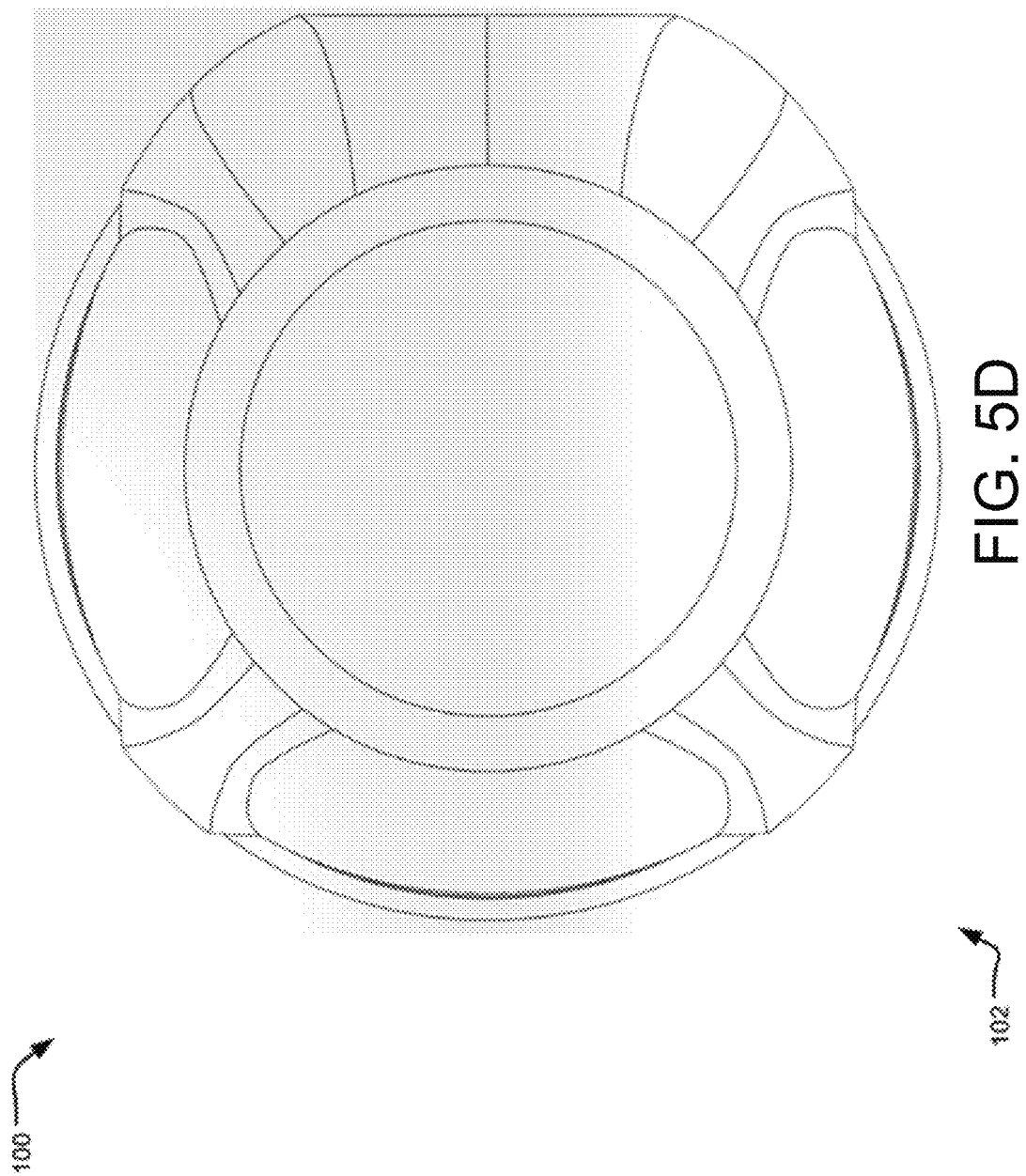
FIG. 5D illustrates a top view of an example system including a plurality of collinear vertical ducts, which can form at least part of an aerial vehicle.
Figure 5E:
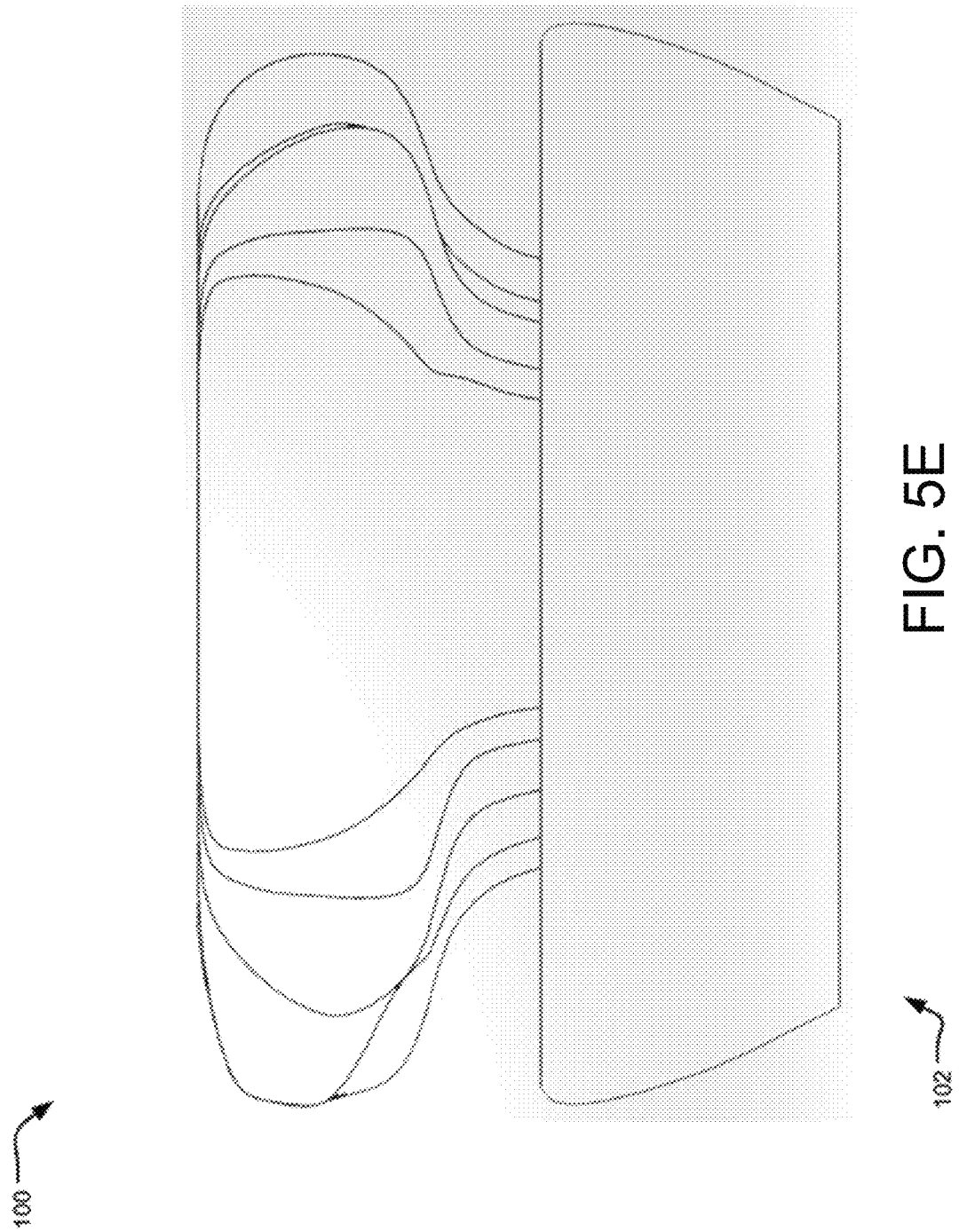
FIG. 5E illustrates a left side view of an example system including a plurality of collinear vertical ducts, which can form at least part of an aerial vehicle.
Figure 5F:
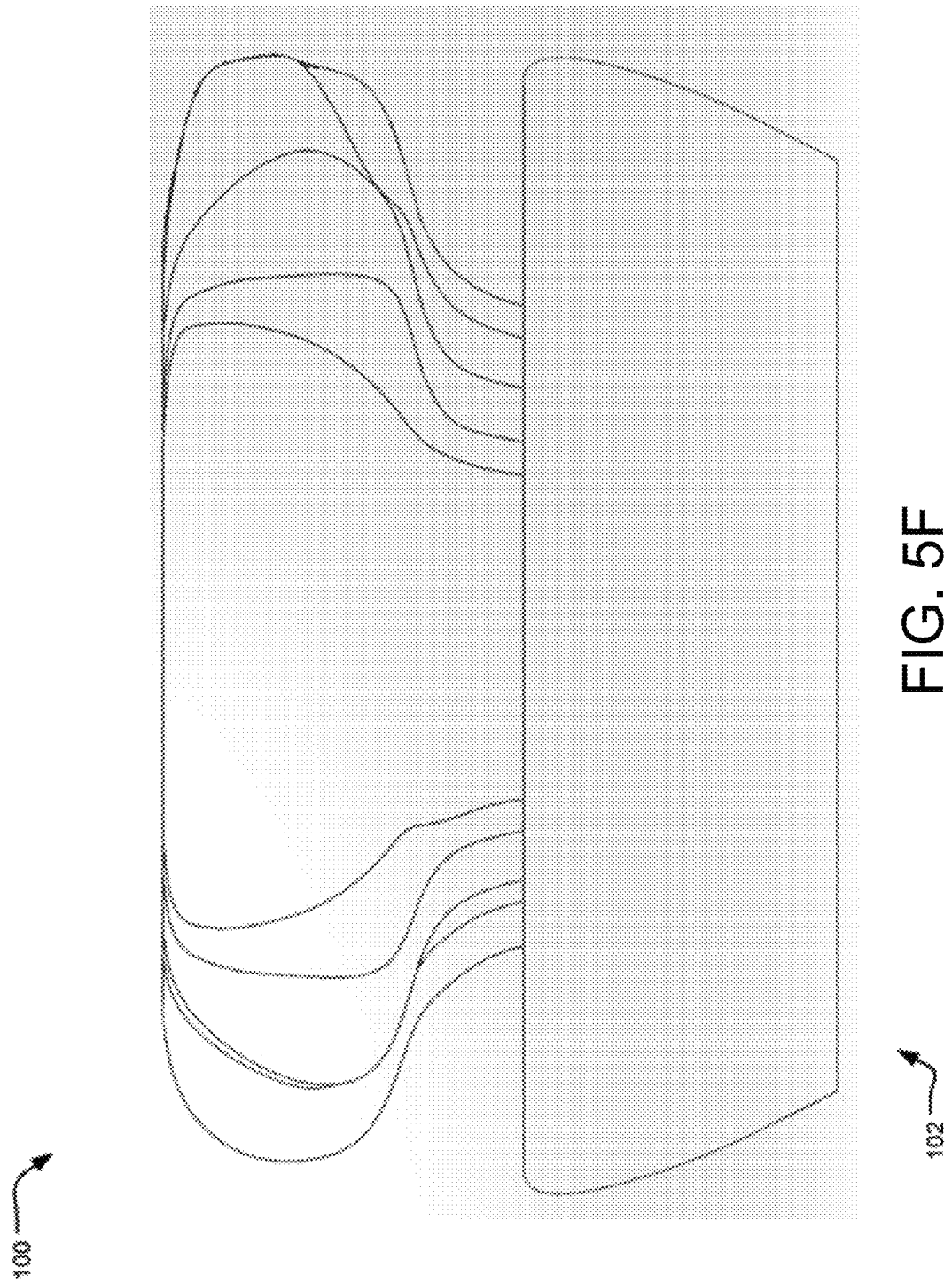
FIG. 5F illustrates a right side view of an example system including a plurality of collinear vertical ducts, which can form at least part of an aerial vehicle.
Figure 5G:
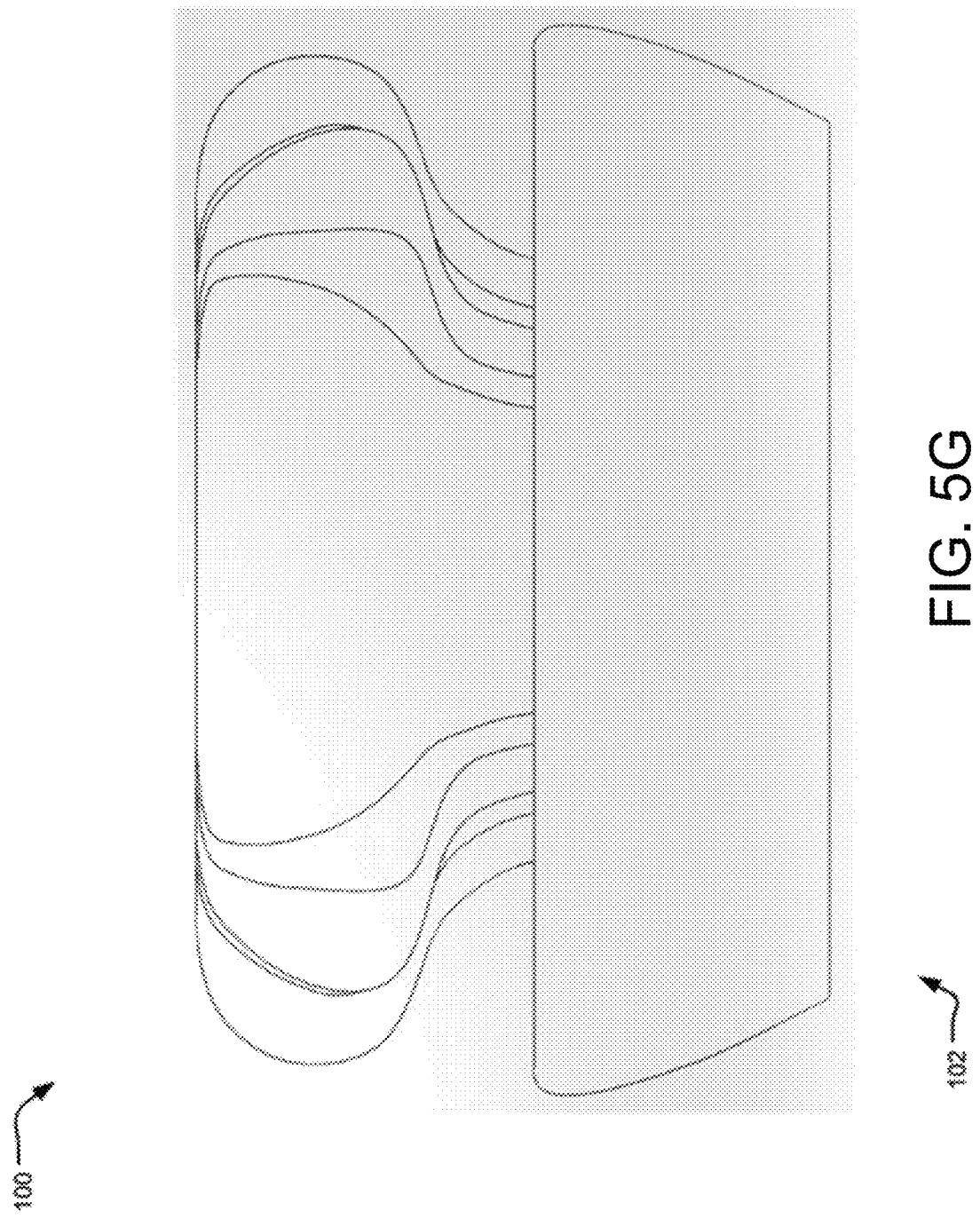
FIG. 5G illustrates a rear elevation view of an example system including a plurality of collinear vertical ducts, which can form at least part of an aerial vehicle.

FIGS. 5A-5G illustrate an example system 100 including an aerial vehicle (AV) 102 with a first vertical duct 104 and/or a second vertical duct 106, which can be coaxially aligned with the first vertical duct 104. FIG. 5A illustrates a front elevation view of the first vertical duct 104 and the second vertical duct of the 106 AV 102; FIG. 5B illustrates a front perspective view of the first vertical duct 104 and the second vertical duct of the AV 102; FIG. 5C illustrates a bottom view of the first vertical duct 104 and the second vertical duct of the AV 102; FIG. 5D illustrates a top view of the first vertical duct 104 and the second vertical duct of the AV 102; FIG. 5E illustrates a left side view of the first vertical duct 104 and the second vertical duct of the AV 102; FIG. 5F illustrates a right side view of the first vertical duct 104 and the second vertical duct of the AV 102; and FIG. 5G illustrates a rear elevation view of the first vertical duct 104 and the second vertical duct of the AV 102. It will be appreciated that although the examples shown and discussed herein reference two ducts, any number may be included, which allows more flexibility in the optimization of rotors or propellers operating rotational speed.

In some instances, the first vertical duct 104 can be a top duct forming an upper portion of the AV 102 and the second vertical duct 106 can be a bottom duct forming a lower portion of the AV 102. One or more duct couplers 108 can couple the first vertical duct 104 to the second vertical duct 106. For instance, the one or more duct couplers 108 can include an arm, beam, or other intermediate member attached to and extending from a bottom portion (e.g., bottom edge 110) of the first vertical duct 104 and attached to a top portion (e.g., top edge 112) of the second vertical duct 106. The AV 102 can include any number of duct coupler(s) 108, such as two, three, four, five, six, etc. The duct couplers may also be utilized to route wires and/or connect components located within the second duct to the first duct containing other electronic components.

Furthermore, the duct couplers 108 can space the first vertical duct 104 apart from the second vertical duct 106 to define an air intake gap 114 between the first vertical duct 104 and the second vertical duct 106. The air intake gap 114 can have a width dimension 116 corresponding to the length dimensions 118 of the duct coupler(s) 108. For instance, the one or more duct couplers 108 can extend from the bottom edge 110 of the first vertical duct 104 at an angle 120, such that the width dimension 116 can be calculated as the length dimension 118 multiplied by the cosine of the angle 120. Moreover, a value of the angle 120 can be based on a difference in size between the first vertical duct 104 and the second vertical duct 106. For example, the first vertical duct 104 can have a first diameter 122 which is less than a second diameter 124 of the second vertical duct 106. In other words, the second vertical duct 106 can be larger than the first vertical duct 104, such that the one or more duct couplers 108 extends outward from the first vertical duct 104 at the angle 120 to couple the first vertical duct 104 to the second vertical duct 106. By way of example, the one or more duct couplers 108 can be formed of fins which are substantially planar with a curved top edge.

In some scenarios, the one or more duct couplers 108 can be moveable responsive to an actuation. For instance, the duct coupler(s) 108 can be hinged at connection point(s) 126 on the first vertical duct 104 and/or the second vertical duct 106. Furthermore, one or more servo motors or other actuators can be coupled to the duct coupler(s) 108 such that an actuation responsive to an electrical signal causes the one or more duct couplers 108 to rotate about their hinges. This can cause the first vertical duct 104 to rotate or move towards and/or away from the second vertical duct 106, which can alter the direction of the aerodynamic resultant force and increase and/or decrease the width dimension 116 of the air intake gap 114 responsive to the actuation and change the direction of the airflow relative to the vertical central axis, thereby generating a control moment on the AV center of gravity which is typically along the vertical central axis. Additionally or alternatively, the duct coupler(s) 108 can be self-retractable or removable. In this way, the AV 102 can be converted between a usable mode and a storage mode by detaching the first vertical duct 104 from the second vertical duct 106 and/or collapsing the AV 102. The one or more duct couplers 108 can be detachable by way of a screw, tongue-and-groove, friction fit, or other actuatable mechanism to cause the duct couplers 108 to separate from the first vertical duct 104 and/or the second vertical duct 106 at the connection point(s) 126. Also, it is to be understood that, in some instances, the one or more duct couplers 108 can be statically and/or fixedly secured to the first vertical duct 104 and the second vertical duct 106 such that the width dimension 116 of the air intake gap 114 is unchangeable. Furthermore, one or more slide channels and/or other mechanisms formed into the first vertical duct 104 and/or the second vertical duct 106 can cause the second vertical duct 106 to be rotatable/pivotable relative to the first vertical duct 104.

In some examples, the AV 102 can include a center post 128 extending along a central axis 130 of the AV 102. A propeller hub 132 can be disposed around the central axis 130 with one or more propeller blades 134 extending from the propeller hub 132 towards the inner surfaces of the first vertical duct 104 and/or the second vertical duct 106. For instance, a first propeller 136 can be disposed within the first vertical duct 104 and a second propeller 138 can be disposed within the second vertical duct 106. With the second vertical duct 106 being larger than the first vertical duct 104, the second propeller 138 can also be larger (e.g., have a greater length and/or width dimension) than the first propeller 136. In some scenarios, the center post 128 and/or the propeller hub 132 can extend continuously through both the first vertical duct 104 and the second vertical duct 106, such that both the first propeller 136 and the second propeller 138 attach to the propeller hub 132. In other scenarios, the center post 128 and/or the propeller hub 132 can be segmented with a space in between (e.g., aligning with the air intake gap 114), such that the first propeller 136 attaches to a first hub segment in the first vertical duct 104, and the second propeller 138 attaches to a second hub segment in the second vertical duct 106.

In some scenarios, the first vertical duct 104 and/or the second vertical duct 106 can define an air pathway 140 through which an airflow 142 generated by the one or more propeller blades 134 passes. The air pathway 140 can include a vertical component extending from a top opening 144 of the first vertical duct 104, through the first vertical duct 104, into a top opening 146 of the second vertical duct 106, and out a bottom opening 148 of the second vertical duct 106. For example and as illustrated in the cross-section view of FIG. 4A, the first vertical duct 104 may intake air and direct the air to the lower duct 106. Moreover, the air pathway 140 can include a side and/or horizontal component, in that air can simultaneously be pulled into the air intake gap 114 by the one or more propeller blades 134 and can pass through the second vertical duct 106 out the bottom opening of the second vertical duct 106. As also illustrated in the cross-section of FIG. 4A, the lower duct 106 may pull in air from the side. Additionally or alternatively, the AV 102 can include one or more turbomachinery component (compressors, impellers, etc.) or gas turbines disposed within the first vertical duct 104 and/or the second vertical duct 106 to drive the airflow 142 through the air pathway 140. The airflow 142 passing through the air pathway 140 can be adjusted and/or affected by various features of the AV 102 to control movement of the AV 102, as discussed in greater detail below.

Figure 5H:
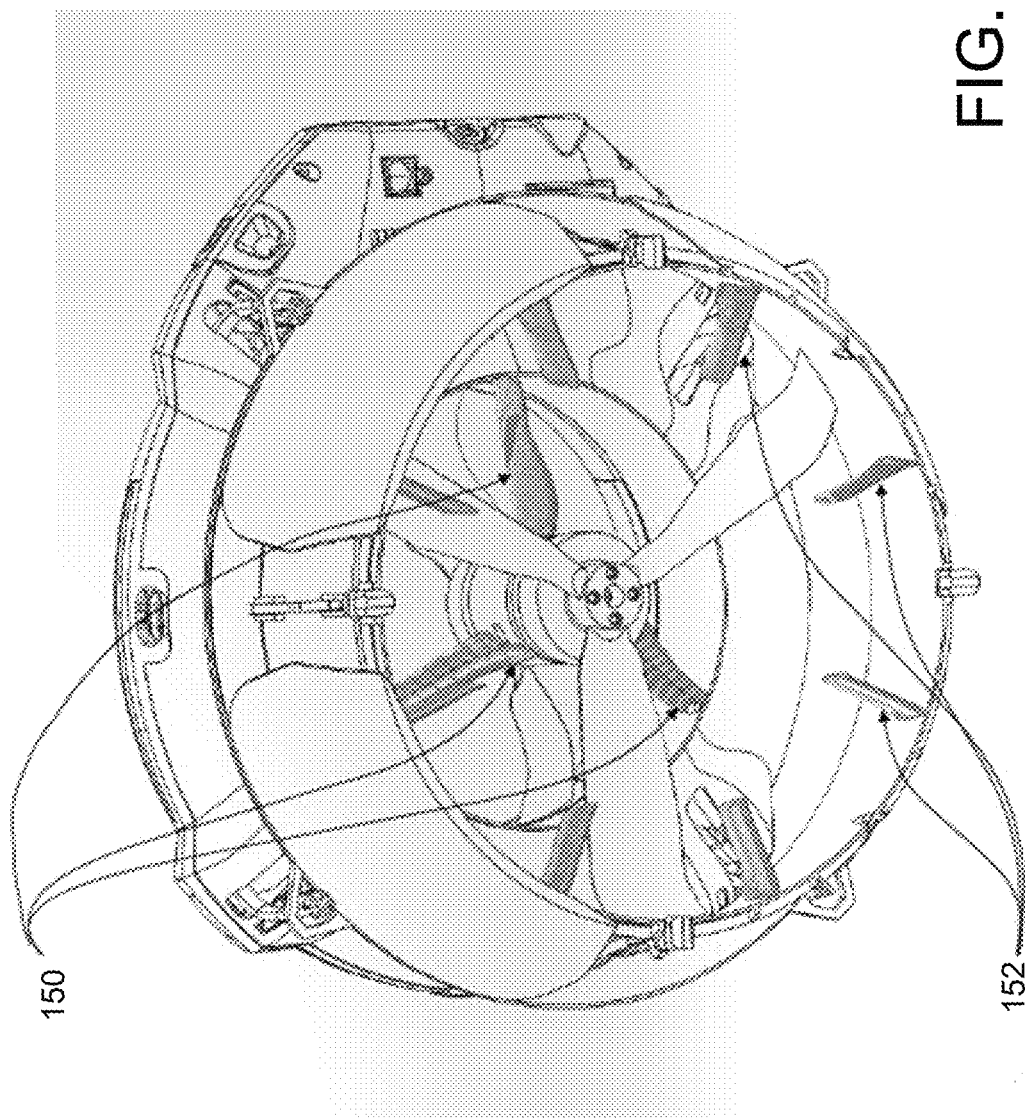
FIG. 5H illustrates a bottom view of an example system including one or more stators for control of airflow through the system.

As noted above, the propulsion mechanism (such as, but not limited to, propellers) can be driven by motors supported by connecting struts that are aerodynamically profiled, such as stators, that can be aerodynamically neutral (with a symmetrical profile at zero flow incidence) or can serve the purpose of redirecting or straightening the flow. Said stators can be positioned above or below propellers, in any number. One particular implementation for such stators is illustrated in FIG. 5H, in which a 3-bladed stator 150 between the top and the bottom propellers has a neutral aerodynamic effect (being aligned with the average flow and made of symmetrical airfoil profiles), but supports the motors while providing a streamlined enclosure to the wires that connect the motors to the batteries (installed in the top main body). In addition, a 12-bladed bottom stator 152 may provide a swirl correction that compensates the higher torque of the bottom propeller to achieve a zero or near zero torque in hovering conditions when the motors operate in a designed rpm ratio. In this particular implementation, the bottom stator blades 152 cover the annular outlet area, leaving the center part unchanged. Therefore, in a hovering condition, the center region flow has a small swirl coming from the top propeller (that has passed through neutral stators 150 with no swirl correction) with an associated torque cancelled by the swirl torque resulting from the bottom propeller and bottom stator 152 (that decreases, but does not zero, the bottom propeller swirl). This particular implementation allows for yaw control by simply increasing one of the motors rotational speed (and optionally decreasing the rpm on the other motor to keep the same lift). For example, if the top motor rotates faster, the swirl in the center region (from the top duct) is stronger, resulting in a vehicle yaw in the opposite direction. If the bottom motor is accelerated, the swirl in the outer annular region will be stronger and the vehicle will yaw in the other direction. In other implementations, stators 150, 152 can be driven by actuators and tilted to change the direction of the airflow and/or induce swirl to generate a torque or a resultant force. For example, tilting of the stators may occur to alter the direction of the vehicle during flight to adjust the airflow around the stators, similar to a controllable wing of an aerial vehicle. The resultant alteration of the airflow may direct the movement of the vehicle in response. In other implementations, the stator blades 150, 152 can be tilted so that yaw control can be achieved without changing the motors rpms. Finally, stators 150, 152 can also provide protection for the propellers (or any other propulsive system), when positioned above the top propeller or below bottom propeller (using this particular implementation for illustrative purpose only. In another implementation, one can take advantage of the axis-symmetry of the vehicle and include one or more cameras or other visual devices that cover the full range, from 0-360 degrees. In this case, the yaw may be achieved electronically, instead of mechanically, meaning the vehicle may be optimized for flying without any mechanical yaw. In particular, the airflow could be straight, aligned with the axis and without any swirl with optimal rpms (in reference to motor noise and power). The electronic yaw may be achieved by either switching the active camera or by continuously composing all the cameras image in a panoramic 360 degrees view.

Figure 6B:
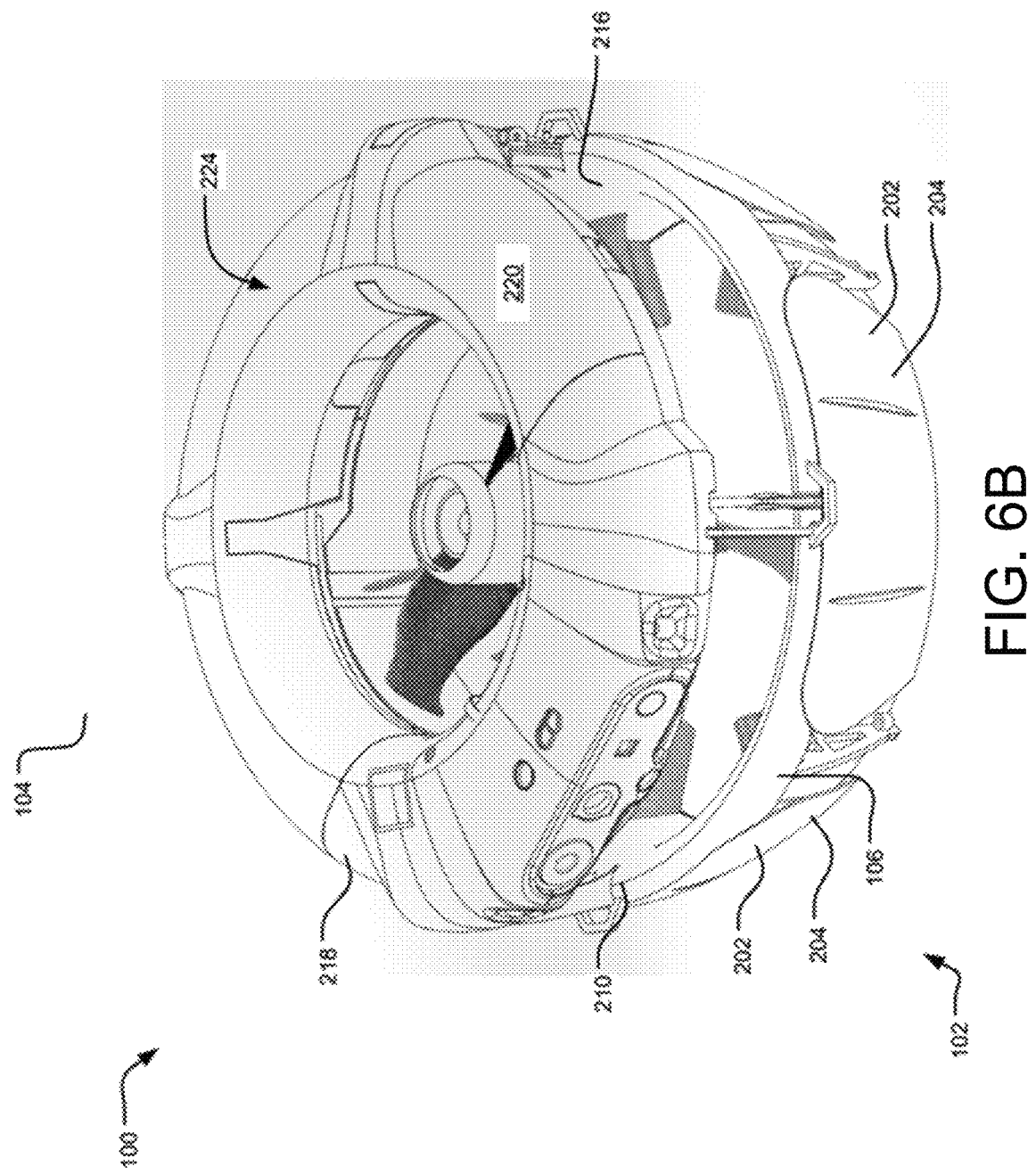
FIG. 6B illustrates a front perspective view of an example system including an aerial vehicle having a plurality of collinear vertical ducts.
Figure 6C:
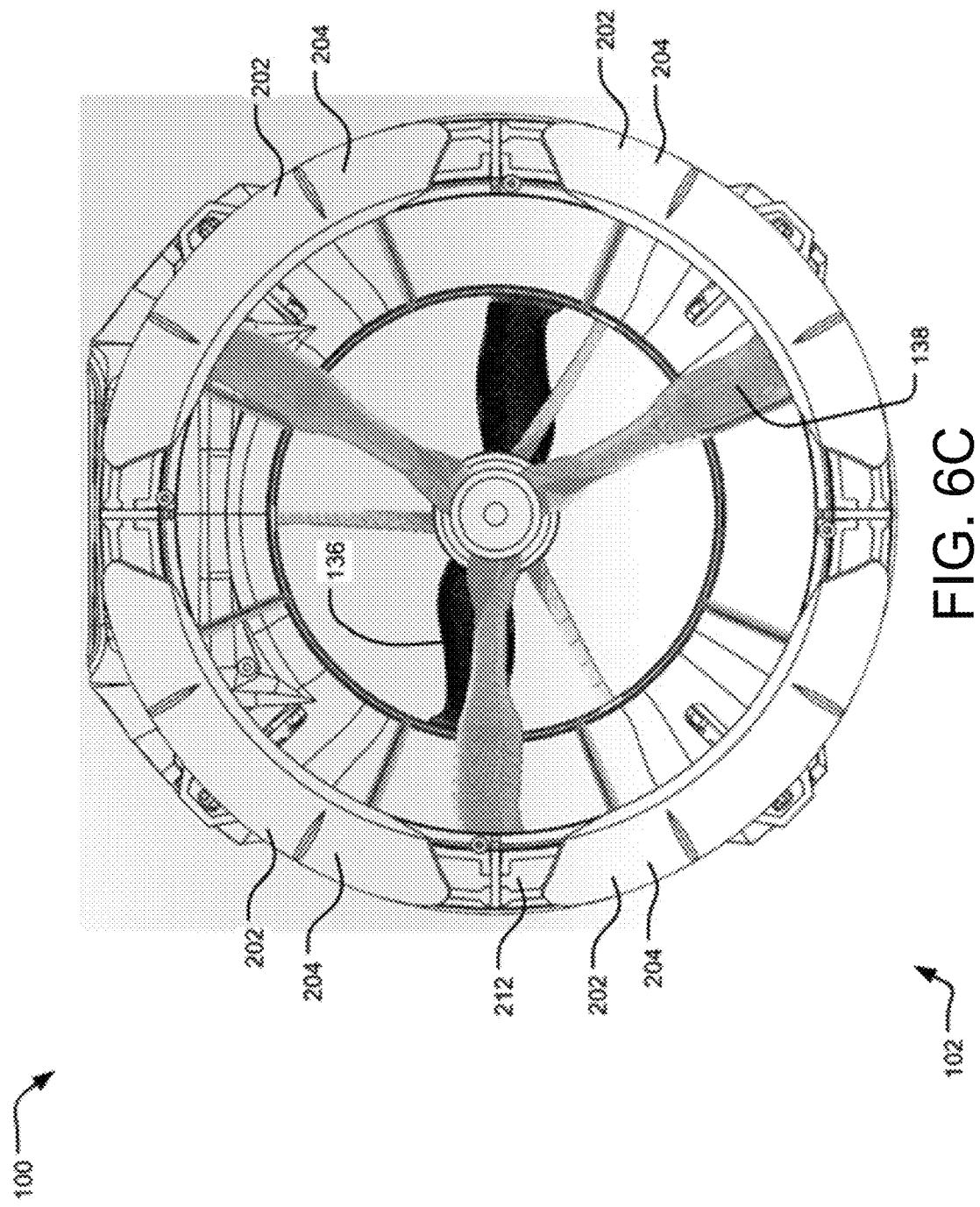
FIG. 6C illustrates a bottom view of an example system including an aerial vehicle having a plurality of collinear vertical ducts.
Figure 6D:
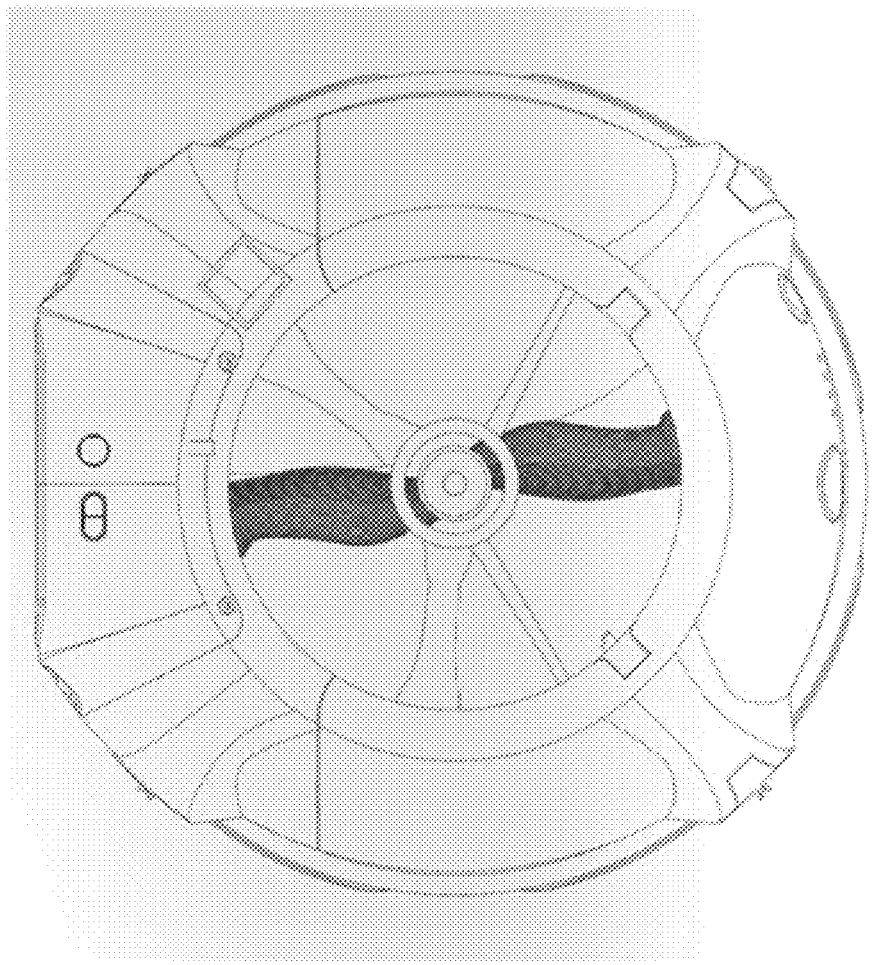
FIG. 6D illustrates a top view of an example system including an aerial vehicle having a plurality of collinear vertical ducts.
Figure 6E:
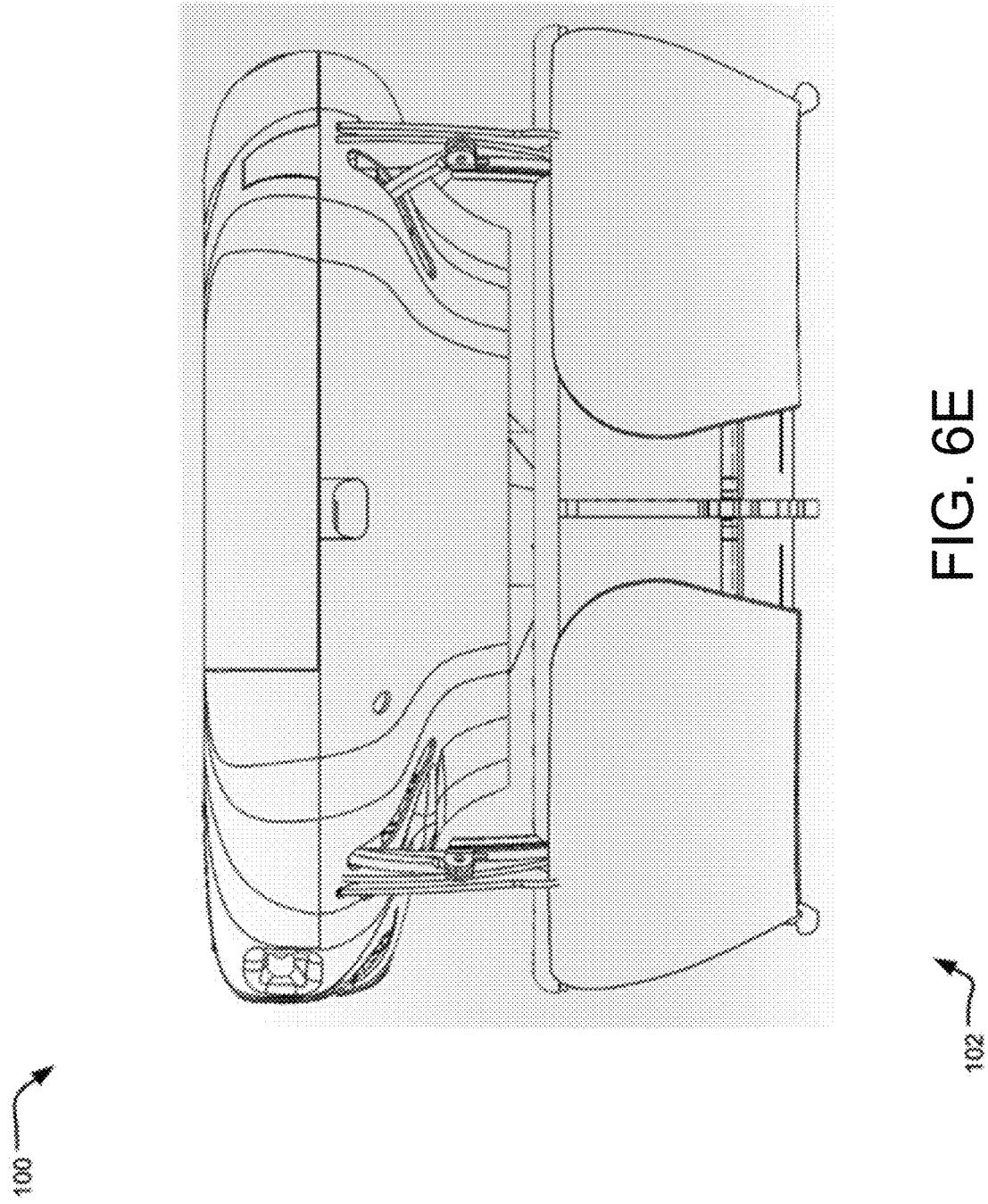
FIG. 6E illustrates a left side view of an example system including an aerial vehicle having a plurality of collinear vertical ducts.
Figure 6G:
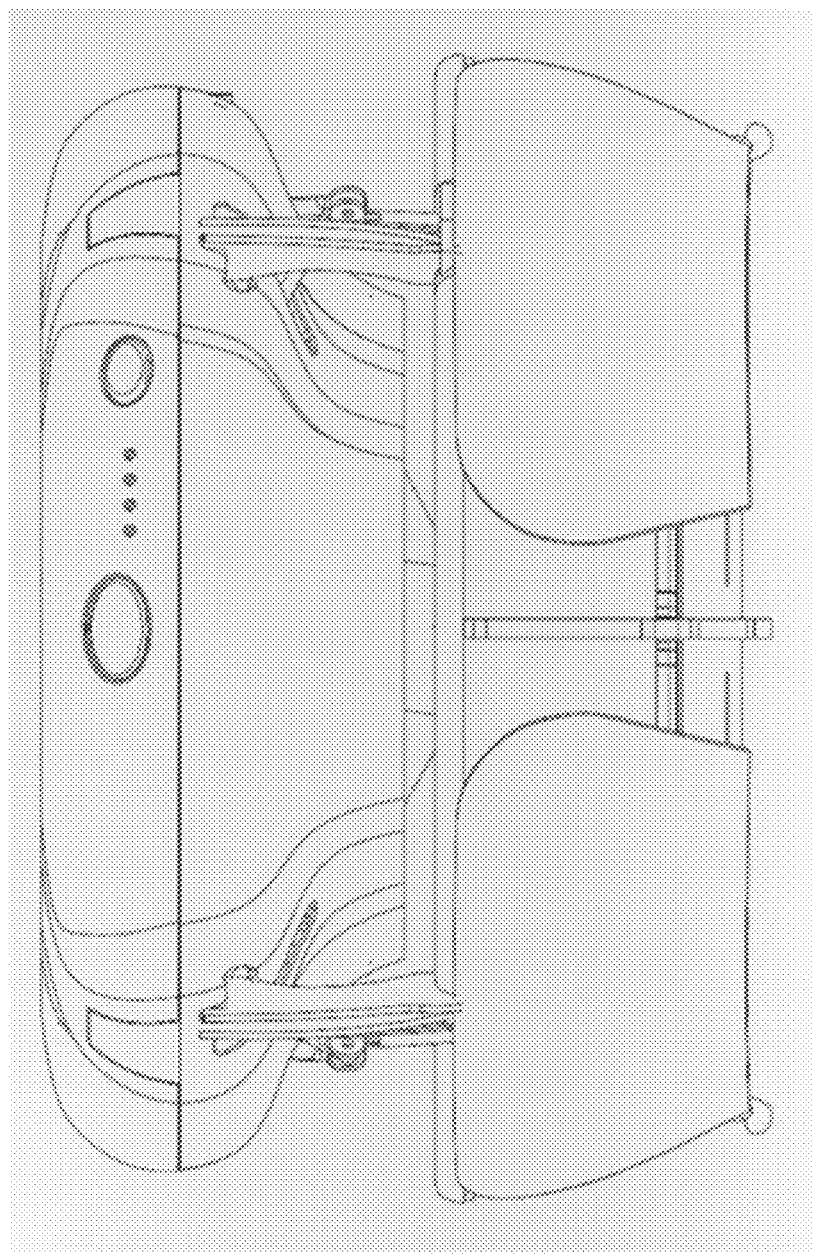
FIG. 6G illustrates a rear elevation view of an example system including an aerial vehicle having a plurality of collinear vertical ducts.

FIGS. 6A-6G illustrate an example system 100 including the AV 102 with the first vertical duct 104 and/or the second vertical duct 106, which can be similar to, identical to, and/or can form at a portion of the system 100 depicted in FIGS. 5A-5G. FIG. 6A illustrates a front elevation view of the AV 102; FIG. 6B illustrates a front perspective view of the AV 102; FIG. 6C illustrates a bottom view of the AV 102; FIG. 6D illustrates a top view of the AV 102; FIG. 6E illustrates a left side view of the AV 102; FIG. 6F illustrates a right side view of the AV 102; and FIG. 6G illustrates a rear elevation view of the AV 102.

As depicted in FIGS. 6A-6G, the AV 102 can include one or more navigation members 202 for controlling movement of the AV 102. The one or more navigation members 202 can be one or more flaps 204 disposed around the second vertical duct 106. The flaps 204 can form extendible/retractable control surfaces (e.g., planar surfaces and/or curved surfaces) to control movement in a plurality of different mediums and spaces (e.g., terrestrial and aerial) by at least partially obstructing or deflecting the airflow 142. For instance, the one or more flaps 204 can be extended into the air pathway 140 defined by the first vertical duct 104 and/or second vertical duct 106 to at least partly redirect the airflow 142 and generate forces which cause a motion of the AV 102, a rotation of the AV 102, or both. In some scenarios, four flaps 204 can extend around the second vertical duct 106 with linkage guides for slidably mounting the flaps to the second vertical duct 106. The four flaps can also be spaced equidistant apart. In some instances, 360° of horizontal directional control can be maintained by adjusting between different insertion profiles of the steering flaps while providing propeller thrust, causing the vehicle to move in a desired direction. A portion of the lift force 206 generated by the propeller blades 134 can be converted into a horizontal thrust force 208 by the navigation members 202 at least partially obstructing or deflecting the airflow 142 out the bottom of the second vertical duct 106. Movement of the flaps 204 can change the configuration of air flow obstruction or direction for controlled maneuvers of the AV 102. These navigation members 202 can be moved by linkages 210 which couple the flaps 204 to the AV 102 (e.g., to a side and/or underside of the first vertical duct 104).

The flap-based control system disclosed herein can be used in an aerial transportation mode and/or a ground surface transportation mode using wheels extending from the bottom of the AV 102. For instance, in non-limiting examples, the AV 102 can include two wheels in the rear and one wheel in the front, to facilitate ground movement through redirecting the lift force 206 laterally to generate a horizontal movement. In other versions, there could be four wheels, with two in the rear and two in the front. It is also possible to position the wheels in a way that the AV 102 leans towards the front or the rear to aid traveling towards the front or the rear respectively. Omnidirectional wheels are also possible to ensure movement in any direction and easier rotation around the vertical axis (e.g., perpendicular to the ground). Other versions can have steerable front wheels or wheels that are free to rotate to facilitate rotation around the vertical axis. In some versions, only two wheels may be used and the flaps can maintain balance and control movement. It will be appreciated that any number, type, and/or configuration of wheels may be used. Several other ground interface components can be used to ensure the reduction of ground friction to allow the vehicle to move easily on different surfaces, including and without limitation, omnidirectional wheels and/or low friction pads. Any of these mechanisms, including wheels, can be permanently fixed, detachable, retractable, and/or the like. In some cases, these mechanisms can be motorized to allow for the remote deployment and/or retraction of the wheels and/or pads (e.g., similar to landing gear on aircraft), and/or manually where a person deploys and/or retracts them. The wheels can also be detachable via a mechanical magnetic lock. The wheels can also be outfitted with mechanisms that allow for braking to allow for faster stopping and prevent the vehicle from unintended movement. In some cases, the wheels could also be retracted to avoid unintended movement and/or to reduce aerodynamic drag while in the aerial transportation mode. Once the AV 102 has landed within a predetermined proximity of a destination location, the wheels and flap navigation system can be used to navigate the AV 102 to the destination location, such as a charging dock, other power source, and/or data upload location. Additionally or alternatively, the AV 102 can include other surface-contacts, such as a tread, track attachment, rollers, a low-friction sliding surface, combinations thereof, and the like.

This configuration can be beneficial when operating indoors or other settings in which the AV 102 may advantageously drive on flat surfaces and fly over obstacles and staircases. For example, the AV 102 may transition to a ground transportation mode when inspecting intricate duct works and piping that are difficult to access and don't allow for stable flight due to the recirculated air that causes turbulence. The ability to navigate in different transportation modes can be useful when precision landing is required (e.g., on a charging station) because the AV 102 can land near the charging station and then can drive to ensure precise final positioning.

In some examples, the second vertical duct 106 can include one or more receiving areas such as insets 212, slots, or cavities for receiving or at least partially receiving the flaps 204. For instance, an outer surface 214 of the second vertical duct 106 can have a plurality of cut outs with a shape corresponding to a shape of the flaps 204. Additionally, the second vertical duct 106 can include one or more slider features such as slots and/or grooves which facilitate the sliding motion of the flaps 204 downward and/or into the airflow 142 at the bottom opening of the second vertical duct 106. The motion of moving into and/or out of the airflow 142 by the flaps 204 can also include moving at least partially towards and/or away from the central axis 130 of the AV 102.

In some examples, the flaps 204 may be positioned in other locations on the AV 102. For instance, the flaps 204 can be positioned along an inner surface 216 of the second vertical duct 106 and/or housed within an interior space of the second vertical duct 106 (e.g., between the outer surface 214 and the inner surface 216). Moreover, the flaps 204 can be disposed at the first vertical duct 104 and/or can be configured to at least partly obstruct the air intake gap 114. The AV 102 can have the flaps 204 at multiple different locations or any combination of the locations disclosed herein. Moreover, in some scenarios, the one or more navigation members 202 can include other types of mechanisms, such as an opening (e.g., formed into the second vertical duct 106) which can be controllably opened and closed, a hinged section of the second vertical duct 106, or any other mechanism which can change and/or obstruct the airflow 142 through the second vertical duct 106 and/or the first vertical duct 104.

Furthermore, the AV 102 can include a housing 218 which can be formed at least partly around the first vertical duct 104. The housing 218 can include an outer shell 220 which at least partially encloses internal components of the AV 102, such as a control system 222. The control system 222 can include computing components and/or software for performing the various operations disclosed herein. For instance, a non-transitory memory storage device can store computer-readable instructions which, when executed by one or more processors, cause the AV 102 to perform the maneuvers and/or navigation operations. This can include actuating the one or more navigation members 202 by moving the linkages 210 and/or changing a propeller rotational velocity. The control system 222 can also control any lighting operations, camera operations, microphone operations, and/or wireless communication transmissions (e.g., using cellular network interface and/or other wireless interface) performed by the AV 102. Any of these components (e.g., a camera, a microphone, a power source, a transceiver, a linkage actuator, and so forth) can be at least partly contained in the housing 218, along with wiring to connect these internal components to the control system 222. The navigational control operations performed by the control system 222 are discussed in greater detail below regarding FIGS. 8 and 9.

Figure 7:
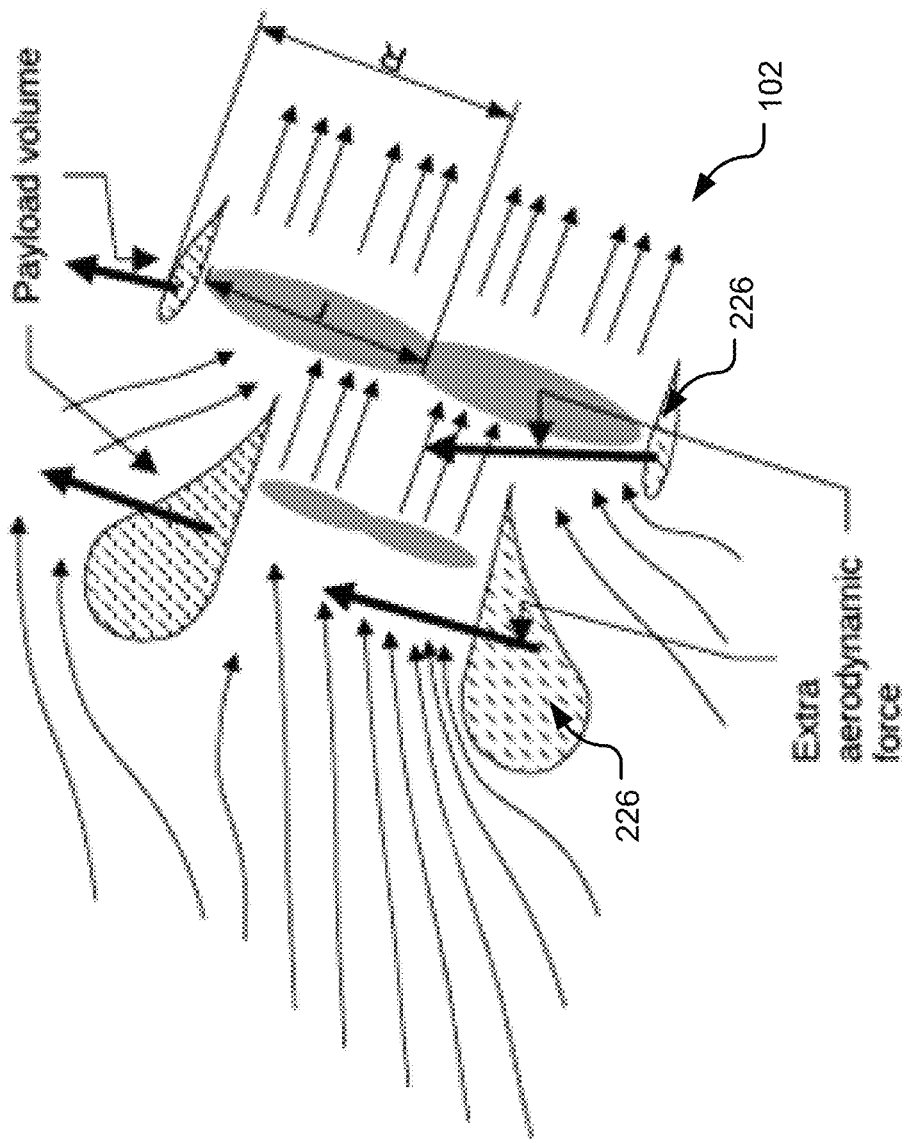
FIG. 7 illustrates a cross-section view of an aerial vehicle in which the body walls are configured to generate a substantial portion of the lift when the AV is flying forwards.

In some examples, the outer shell 220 of the housing 218, the first vertical duct 104, the second vertical duct 106, the one or more duct couplers 108, the one or more navigation members 202, and/or any other externally exposed components of the AV 102 can have contours to improve the airflow 142 and/or the overall aerodynamics of the AV 102. For instance, the housing 218 and/or the first vertical duct 104 enclosed by the housing 218 can have a generally rounded ring shape 224 with a tapered lower portion 226. The tapered lower portion 226 can be formed by the housing 218 and/or the first vertical duct 104 having a shape which transitions from a convex curve to a concave curve before terminating at the air intake gap 114. Furthermore, in some scenarios, portions of the AV 102, such as the first vertical duct 104 and the second vertical duct 106, can be shaped to operate as an airfoil. For instance, the AV 102 may be rotatable in pitch or roll such that the airflow 142 transitions from a vertical configuration to a horizontal configuration. In the horizontal configuration, the ducts 104, 106 can act similarly to a fixed wing as the AV 102 travels at least partly horizontally, generating a substantial portion of the lift necessary to fly. FIG. 7 illustrates such an example in a cross-section view of the AV 102 where the body walls are designed to generate a substantial portion of the lift when the AV is flying forwards, decreasing the power requirement from the motors and therefore increasing efficiency. In this case, the body ducts or walls 226 play a role similar to the regular wing of an aircraft The one or more navigation members 202 of the AV 102 can still be used to perform maneuvers (e.g., movements upward, downwards, to the left, and/or to the right) when the AV 102 is in the horizontal configuration. In another configuration, the forward flight lift can also be partially generated by additional aerodynamic surfaces, such as wings. Said wings can be fixed or deployed just during forward flight, being retrieved when the vehicle is mostly hovering or landing. In other words, for horizontal flight, the plurality of ducts with respective driving mechanisms and flow paths can be part of a larger system, providing the necessary thrust to maintain the forward velocity.

Figure 8:
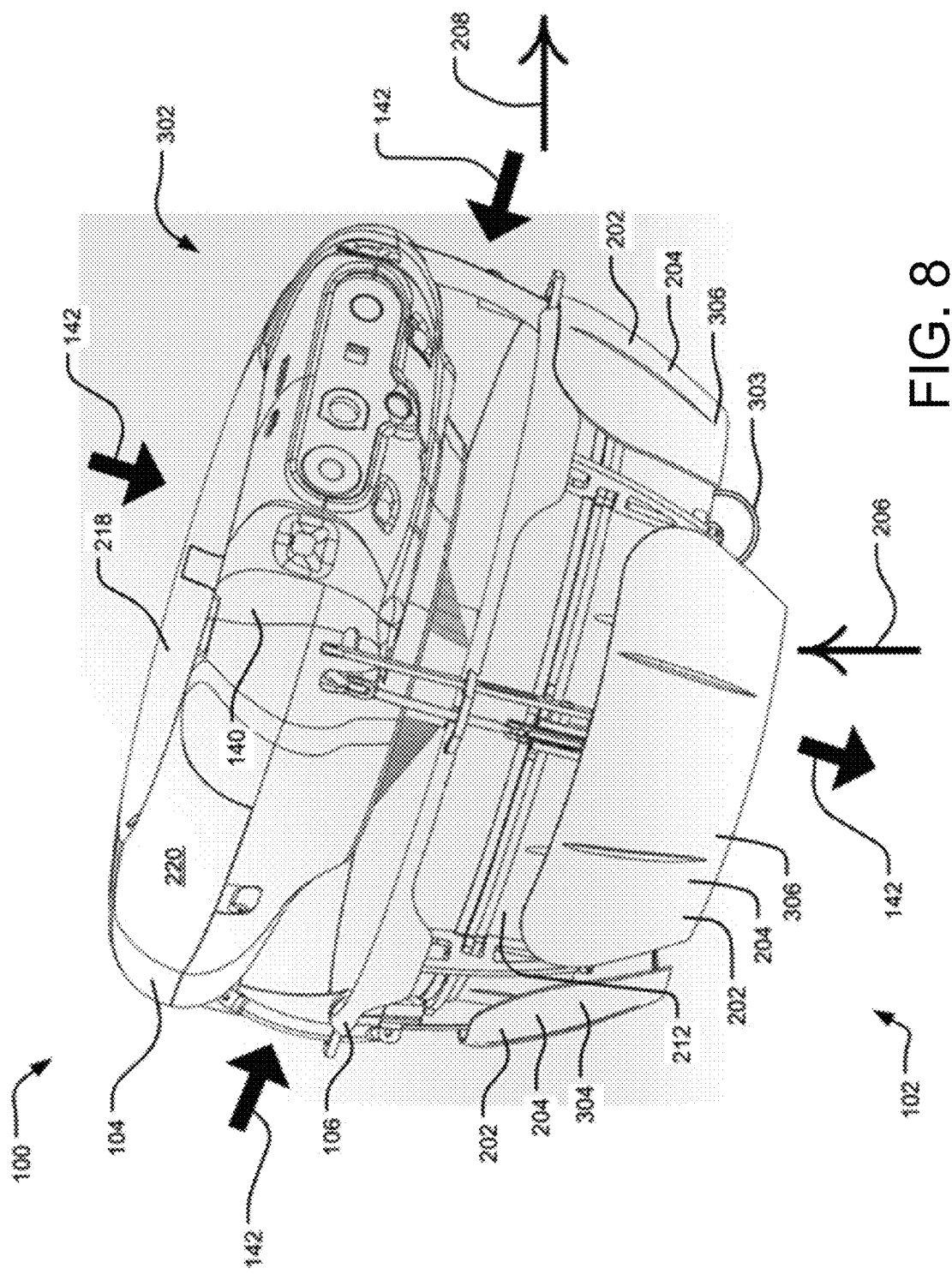
FIG. 8 illustrates a side perspective view of an example system including an aerial vehicle having a plurality of collinear vertical ducts performing a maneuver.

FIG. 8 depicts an example system 100 including the AV 102 with the first vertical duct 104 and/or the second vertical duct 106, which can be similar to, identical to, and/or can form at a portion of the system 100 depicted in FIGS. 5A-6G.

As depicted in FIG. 8, the AV 102 can use the flaps 204 to perform one or more maneuver(s) 302. The maneuver(s) 302 can include a flight maneuver when the AV 102 is in air (e.g., "aerial mode") and/or a steering/driving maneuver when the AV 102 is traveling on a surface and/or the ground (e.g., "ground mode") via the wheels 303. The maneuver(s) 302 can include extending a first flap 304 and/or a second flap 306 to generate a thrust force component 208 from the airflow 142 passing through the bottom opening of the second vertical duct 106. Additionally or alternatively, the maneuver(s) 302 can include extending all of the one or more navigation members 202 to change a lift force component 206 thus changing and/or maintaining a height of the AV 102. The maneuver(s) 302 can further include a rotational maneuver. Moreover, the maneuver(s) 302 can include changing a rotational speed of the one or more propeller blades 134 in conjunction or alternatively to extending and/or retracting the flaps 204.

In some examples, the maneuver(s) 302 can be caused and/or controlled by the control system 222 executing various software steps. For instance, flap insertion can be governed by the control system 222 using the following formula:

$$I_x = \gamma * F_x(\alpha) + i_{start} \text{ where } F_x(\alpha) = F(\alpha + \delta_x)$$

where: x can be the flap index; $I_x$ can be the amount of flap insertion for flap x; $\gamma$ can be the magnitude of control as calculated by a control algorithm of the control system 222 which can take into account sensor measurements and desired position, angles, acceleration, velocities, etc.; $\alpha$ can be the angle corresponding to the direction of the desired thrust vector; $\delta_x$ can be the angle offset of each flap 204 from the forward direction of travel of the vehicle; $F(\alpha+\delta_x)$ can be the relative flap insertion required to generate a thrust vector in direction $\alpha$; and $i_{start}$ can be the starting flap insertion between 0 and 1. In some cases, the flaps 204 can start at a non-zero value. This could be in cases where small flap insertions don't result in any meaningful vectoring of thrust. In such cases the $i_{start}$ parameter may enable the flaps 204 located in the direction opposite $\alpha$ to retract.

In some examples, the plurality of flaps 204 can each use the same function F. In doing so, the relative location of each flap can be taken into account. For controlling the AV 102, the following offsets can be used for four flaps:

| x | $\delta_x$(deg) |
|---|---|
| 1 | −45 |
| 2 | 45 |
| 3 | 135 |
| 4 | −135 |

In some scenarios, the control system 222 can implement a non-linear function to maximize control over certain regimens of the airflow 142 and to account for the effects of having more than one flap 204 deployed at certain points. In some iterations, the flaps 204 may start at a nonzero position, for example when the thrust vector amount is not substantial enough at small flap insertions. In such cases, the flaps 204 may still fully retract to the zero position but only after an opposite flap is fully inserted. These techniques can provide more precise control in a desired direction along the x and y axes.

In some examples, to vector the thrust towards 0°, a third flap 308 and a fourth flap can be inserted an equal amount while the first flap 304 and the second flap 306 are at the $i_{start}$ position. To angle the thrust towards 45°, the second flap 306, the third flap 308, and the fourth flap can be inserted an equal amount while the first flap 304 is at the $i_{start}$ position. To angle the thrust towards 67.5°, the second flap 306 and the third flap 308 can be inserted equally while the fourth flap is inserted less than second flap 306 and the third flap 308 while the first flap 304 is at the $i_{start}$ position. In this example, $i_{start}$ is at 0.

In some instances, the AV 102 can use different flap insertion profiles for thrust vectoring in aerial transportation mode versus ground transportation mode. For example, during flight, to travel in a 0° heading, the third flap 308 and the fourth flap may be deployed. On the ground, to travel in a 0° heading, the first flap 304 and the second flap 306 may be deployed instead. In other words, the transition between the different operation modes can include reversing the direction of the thrust vector. A first flap insertion profile for the aerial transportation mode may be an opposite and/or inverted profile relative to a second flap insertion profile for the ground transportation mode. In some instances, associating directions with flap insertion amounts/profiles is a computationally efficient way to control the direction of the vehicle, such that the control system can maintain and/or change directional control of the vehicle using minimal resources.

In some instances, the control authority of each flap 204 can change depending on the speed of each propeller and the resulting thrust magnitude. To compensate for this, the flap insertion formula may include an additional term:

$$F_x(\alpha)=F(\alpha+\delta_x,T)$$

Where T represents the amount of thrust generated by the propellers. Alternatively, the individual speeds of each motor can also be used instead of thrust. In this case, the formula may include:

$$F_x(\alpha)=F(\alpha+\delta_x,P_1,P_2)$$

Where $P_1$ is the speed of the first propeller and $P_2$ is the speed of the second propeller. In some cases, the amount of control is dictated by the bottom propeller alone, or predominantly.

In some instances, the pitch up moment can be corrected for by modifying the insertion of the flaps, therefore changing the amount of torque produced by the flaps to counter the pitch up moment. One or all of the velocity and/or the orientation can be used to calculate a modified flap insertion. In this case, the formula to calculate flap insertion would become:

$$F_x(\alpha)=F(\alpha+\delta_x,\underline{\Omega},\underline{v})$$

where $\Omega$ is a vector of euler angles denoting the current orientation of the vehicle, and v is a vector of the velocities of the vehicle.

Figure 9:
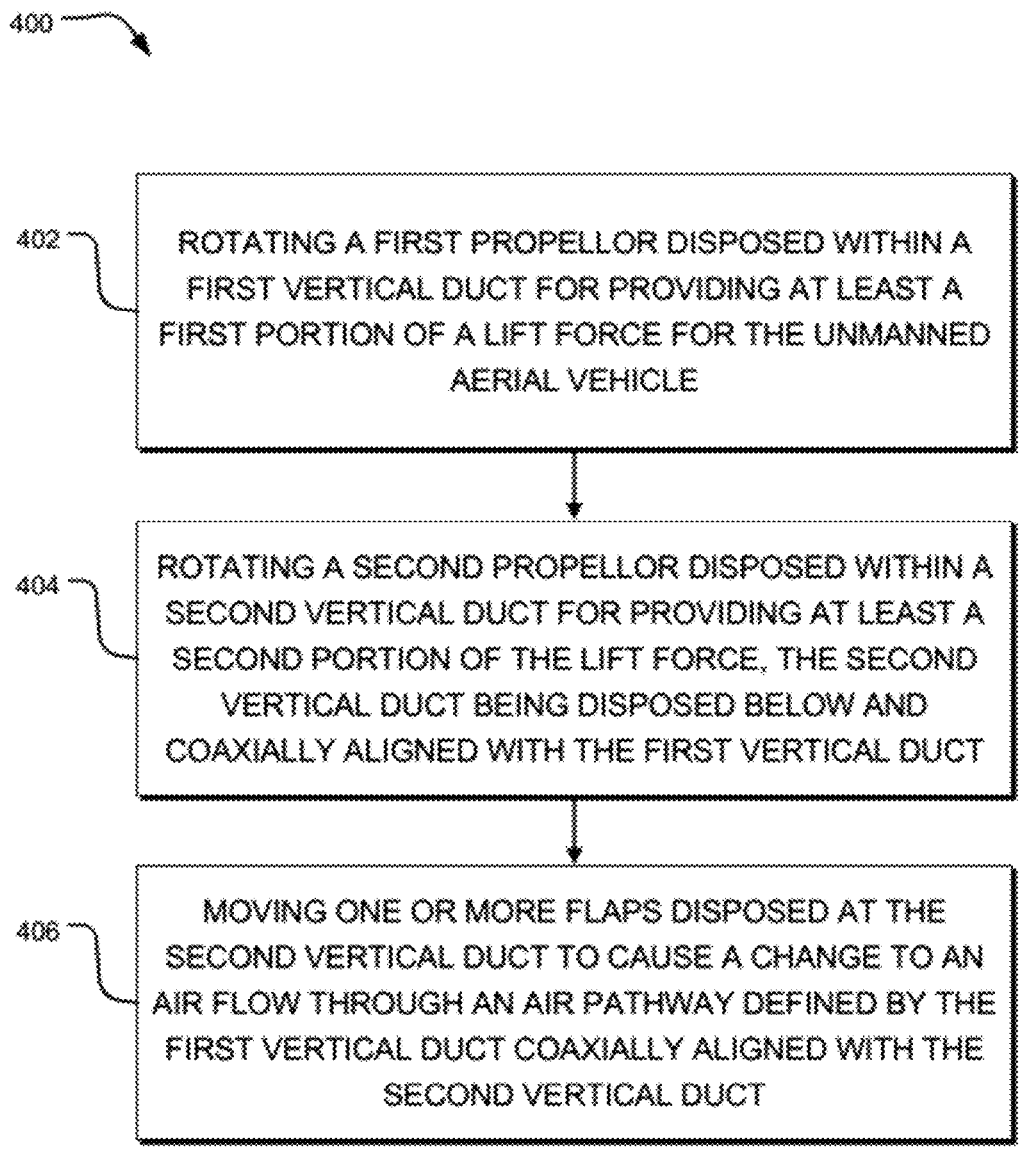
FIG. 9 illustrates a block diagram of an example method for controlling an aerial vehicle having two collinear vertical ducts.

FIG. 9 illustrates an example method 400 of controlling the AV 102, which can form at least a portion of and/or be performed by the system(s) 100 disclosed herein.

In some instances, at a first operation 402, the method 400 can rotate a first propeller disposed within a first vertical duct for providing at least a first portion of a lift force for the aerial vehicle. At operation 404, the method 400 can rotate a second propeller disposed within a second vertical duct for providing at least a second portion of the lift force, the second vertical duct being disposed below and coaxially aligned with the first vertical duct. At operation 406, the method 400 can move one or more flaps disposed at the second vertical duct to cause a change to an air flow through an air pathway defined by the first vertical duct coaxially aligned with the second vertical duct.

As noted above, causing the change to the air flow can affect a lift force component, and the aerial vehicle can be maneuvered based on the change to the air flow affecting the lift force component. In one implementation, one or more of the first vertical duct 104 and/or the second vertical duct 106 may be moveable or actuated relative to the opposite duct to generate a moment for maneuvering the AV. For example, FIG. 10A illustrates a cross-section view of an AV in which the second duct 106 is horizontally displaced from the first duct 104. The second duct 106 may be oriented in the illustrated configuration through an actuation of the second duct into the unaligned position. FIG. 10B illustrates a displacement of the second duct 106 from an alignment with the first duct 104 that also includes an additional degree of freedom (i.e., tilt angle displacement in addition to horizontal displacement). The second duct 106 may be oriented in this configuration through one or more additional actuators. In this manner, one or more actuators may be activated to displace the first duct 104 and/or the second duct 106 to generate a thrust displacement in a plane (as shown in FIG. 10A) or at a tilted angle (as shown in FIG. 10B). Actuators may also move the first duct 104 and/or second duct 106 vertically in relation to each other to collapse the ducts into a storage mode or to extend a distance between the ducts for flight mode. In general, the ducts of the AV may be oriented and/or moved into any configuration through the activation of one or more actuators of the AV.

In some instances, the AV may include a body portion composed of sections of swappable modules which can be easily changed according to different intents or uses of the AV. For example, one such module could have additional cameras or electronics, another module may provide extra energy storage (such as a battery pack), or another module may carry chemicals or fuel. Depending on a given specific mission goal, the payload may easily be selected by switching one or more of these modules.

In another possible implementation, the body of the upper duct and/or the bottom duct may have walls that are built in multiple thin layers of metal and/or dielectric material providing structural strength and electrical energy storage. In other words, the body shell walls can be constructed to operate as a supercapacitor device, taking advantage of the enormous volume and area available in comparison to traditional quad drones or other aerial vehicles.

The volume available in the housing 218 may be used, in some instances, to carry passengers for urban transportation. The passenger seats may be self-tilting to keep a comfortable position while the aerial vehicle changes flight angles to maintain optimal performance. In this configuration, the AV can launch and land vertically in confined spaces while maintaining performance due to the available airflow area.

The implementations mentioned herein provide for various configurations and optimizations for the AV. For example, portions of the AV may be detachable for storage and reattached for operation. Different modules can be used to form the ducts of the AV or can be inserted in the ducts to provide different flying operations. Further, some implementations may include a duct, such as the bottom-most duct, with a configurable shape to respond to wind gusts, generating a correcting moment to compensate for wind gusts that may tilt the AV during flight. The AV may therefore receive the wind gusts and the shape of the duct may conform in response to the wind gust.

In another implementation, at least of the payload sections of the AV may include a mechanism, such as a ramp or automatic arm, to provide an item or cargo delivery. In another example, the AV may eject an item or cargo from the payload section. Such cargo delivery may occur after landing or while hovering near the ground. The payload area may also be used to transport passengers. In such examples, the seats may optionally tilt according to a flight angle to provide comfort while flying.

Optimization of one or more components of the AV may also be included in some designs. For example, one or more stators or diffusers of the AV may be used to provide support for the motors, protection from the environment, housing for wires or fuel supply (from battery or fuel tank to a motor or engine), and/or housing for transmission shafts. Such stators can be aerodynamic neutral or be used as a means to change the airflow direction. Yaw control of the AV can be achieved by changing the rotational speed (rpm) of the propellers and/or by means of changing at least some of the stator blades angle. Part of the duct walls may be built in a way to provide double functionality, namely structural strength and energy storage, through layers of metal or metal-oxide forming an embedded battery or supercapacitor. Some implementations of the AV may also include deployable wings that unfolds when flying forward in an almost horizontal tilt angle, or is the thrust system of a larger fixed wing vehicle.

The various disclosed mechanisms for vectoring the thrust can apply to any vehicle that uses thrust vectoring. While the presently disclosed technology has been described with reference to various implementations, it will be understood that these implementations are illustrative and that the scope of the presently disclosed technology is not limited to them. Many variations, modifications, additions, and improvements are possible. More generally, implementations in accordance with the presently disclosed technology have been described in the context of particular implementations. Functionality may be separated or combined differently in various implementations of the disclosure or described with different terminology. These and other variations, modifications, additions, and improvements may fall within the scope of the disclosure as defined in the claims that follow.

The invention claimed is:

1. An aerial vehicle comprising:
 a first duct defining at least a first portion of an air pathway for generating a lift force;
 a second duct defining at least a second portion of the air pathway, the second duct vertically offset with the first duct;
 a plurality of links extending between the first duct and the second duct; and
 one or more propulsion devices arranged within the air pathway to obtain an airflow profile downstream of the aerial vehicle for thrust and control of the aerial vehicle.

2. The aerial vehicle of claim 1, further comprising:
 one or more flaps coupled to the first and/or second duct and movable between different positions for controlling movement of the aerial vehicle by affecting the airflow.

3. The aerial vehicle of claim 1, wherein the first duct has a first diameter and the second duct has a second diameter different than the first diameter.

4. The aerial vehicle of claim 1, wherein the plurality of links comprise one or more hinged duct couplers operable to move the second duct relative to the first duct.

5. The aerial vehicle of claim 1, wherein the one or more propulsion devices comprise a propeller, a rotor, a turbomachinery component, or a gas combustion jet.

6. The aerial vehicle of claim 1, wherein at least one of the first duct and the second duct comprise an annular aerodynamic shape and generate a lifting force during a horizontal flight of the aerial vehicle.

7. The aerial vehicle of claim 1 further comprising one or more detachable portions, the one or more detachable portions providing a smaller vehicle footprint for storage and configurability of the first duct and the second duct.

8. The aerial vehicle of claim 1, further comprising a first propeller and a second propeller, the first propeller driving a center portion of the air pathway, wherein a portion of the second propeller is configured to have an aerodynamically neutral profile.

9. The aerial vehicle of claim 8, further comprising a downstream propeller with blades present only in an annular region that is a secondary portion of the air pathway different from the center portion, the secondary portion of the air pathway received through a secondary inlet region to the air pathway.

10. The aerial vehicle of claim 1 wherein the one or more propulsion devices comprises a plurality of propulsion devices, each of the propulsion devices operate at different speeds.

11. An aerial vehicle comprising:
 a first duct defining at least a first portion of an air pathway;
 a second duct defining at least a second portion of the air pathway, the second duct being disposed below and collinearly aligned with the first duct;
 a plurality of links extending between the first duct and the second duct;
 one or more propulsion devices arranged within the second duct to pull air through at least an air intake gap defined between the first duct and the second duct; and
 one or more movable navigation members coupled to the second duct for controlling movement of the aerial vehicle.

12. The aerial vehicle of claim 11, wherein the one or more movable navigation members includes a plurality of wheels extending from the second duct to operate the aerial vehicle as a terrain vehicle.

13. The aerial vehicle of claim 11, wherein:
 the one or more propulsion devices comprises at least a first propeller disposed within the first duct and a second propeller disposed within the second duct.

14. The aerial vehicle of claim 11, wherein the aerial vehicle includes one or more actuators to cause the aerial vehicle to perform a maneuver operation by extending at least one of the one or more movable navigation members into the air pathway.

15. A method of controlling movement of an aerial vehicle, the method comprising:
 generating at least a first portion of a lift force for the aerial vehicle by rotating a first propeller disposed within a first vertical duct;
 generating at least a second portion of the lift force by rotating a second propeller disposed within a second vertical duct, the second vertical duct disposed below and coaxially aligned with the first vertical duct;
 disposing one or more hinged duct couplers extending between the first duct and the second duct; and
 causing a change to an air flow through an air pathway defined by the first vertical duct coaxially aligned with the second vertical duct, the change to the air flow caused by moving one or more flaps disposed at the second vertical duct.

16. The method of claim 15, wherein causing the change to the air flow affects a resultant force component, the aerial vehicle is maneuvered based on the change to the air flow affecting the resultant force component.

17. The method of claim 15, wherein rotating the second propeller includes pulling air through an air intake gap between the first vertical duct and the second vertical duct.

18. The method of claim 15, further comprising:
actuating the one or more hinged duct couplers, such that the first vertical duct moves relative to the second vertical duct as part of a flight maneuver.

19. The method of claim 15, further comprising:
actuating the one or more hinged duct couplers, such that the serial vehicle collapses into a storage mode.

\* \* \* \* \*